July 30, 1929.  B. JORGENSEN  1,722,499
LASTING MACHINE
Filed Nov. 13, 1923  12 Sheets-Sheet 1

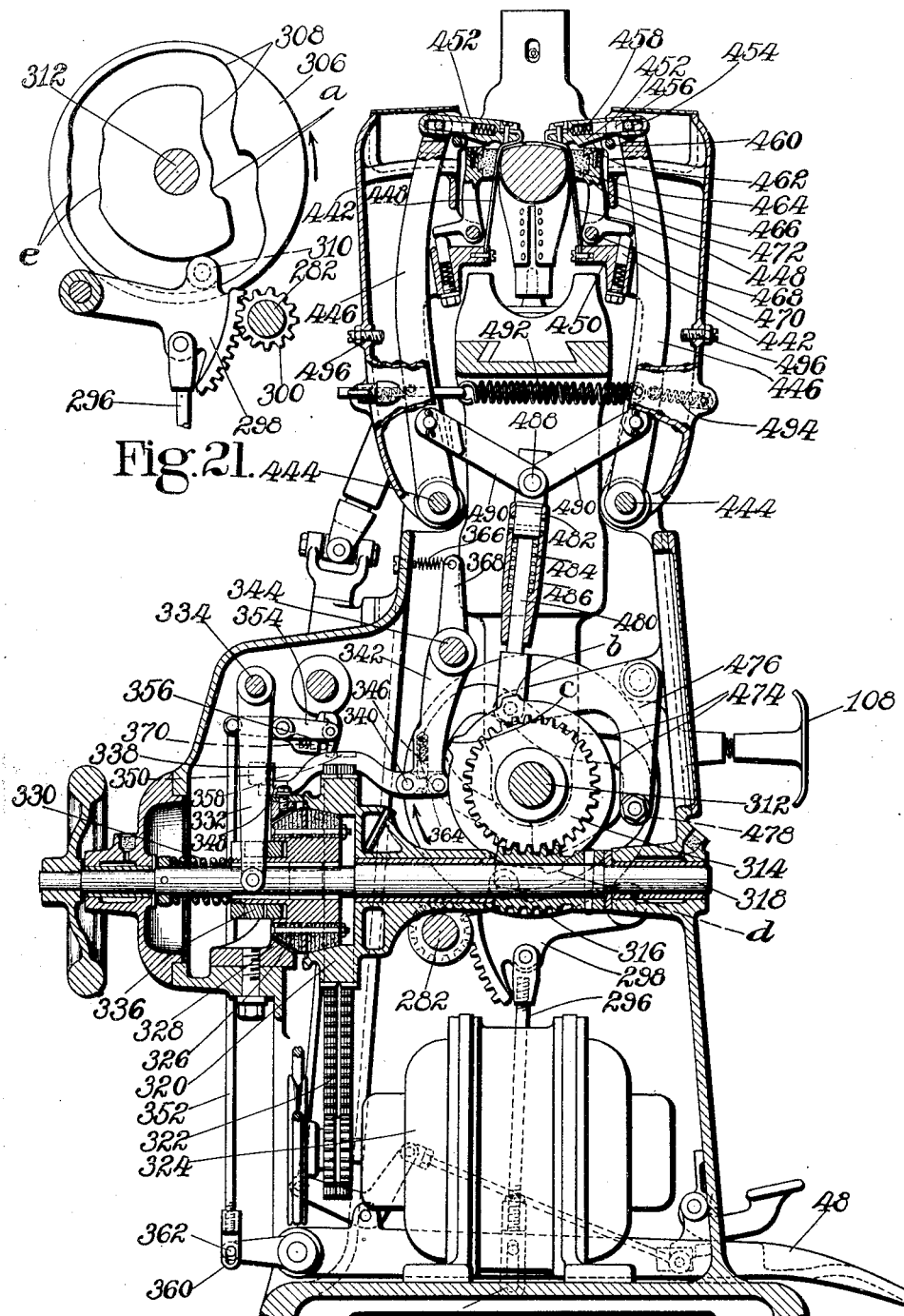

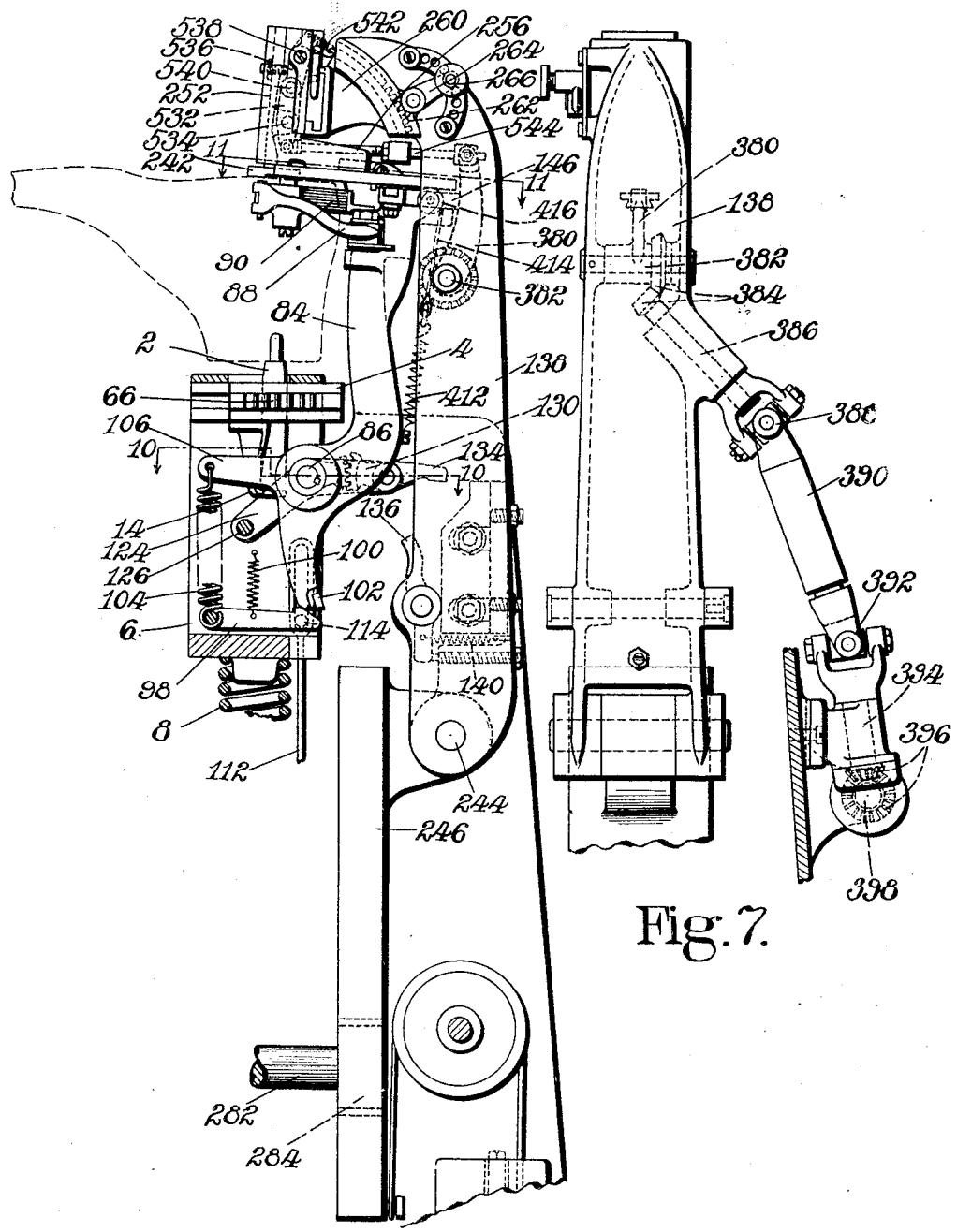

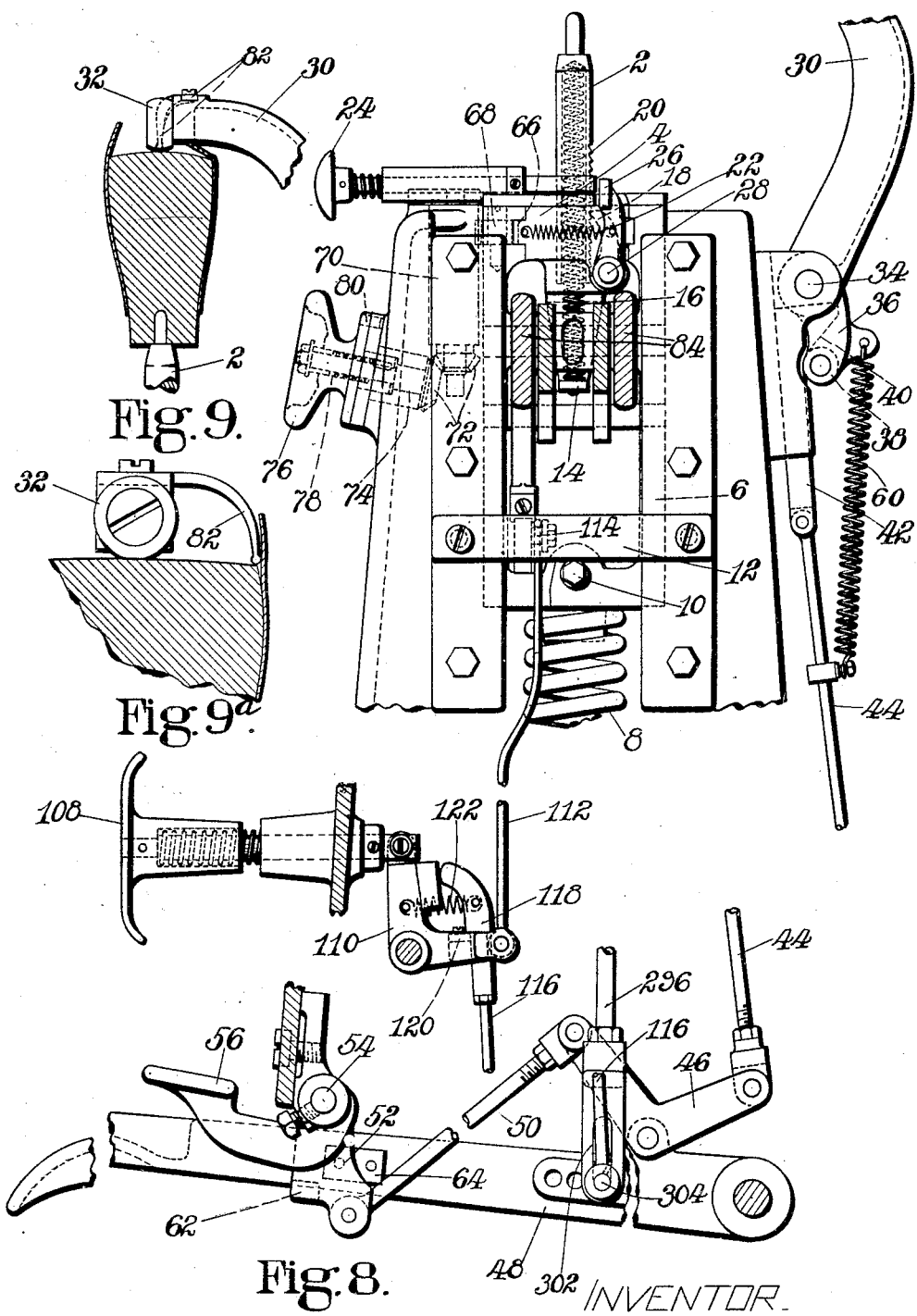

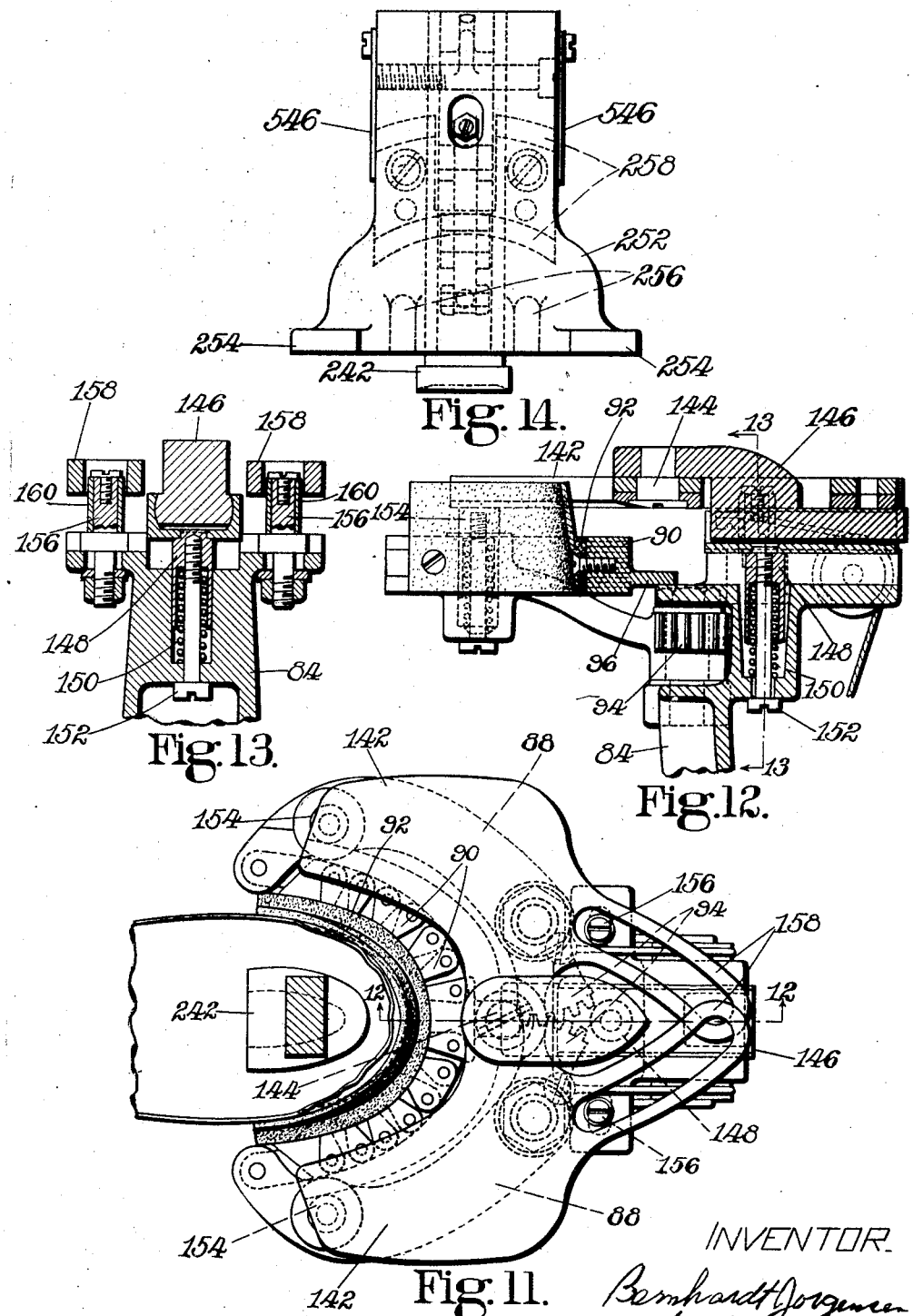

July 30, 1929.  B. JORGENSEN  1,722,499
LASTING MACHINE
Filed Nov. 13, 1923   12 Sheets-Sheet 10
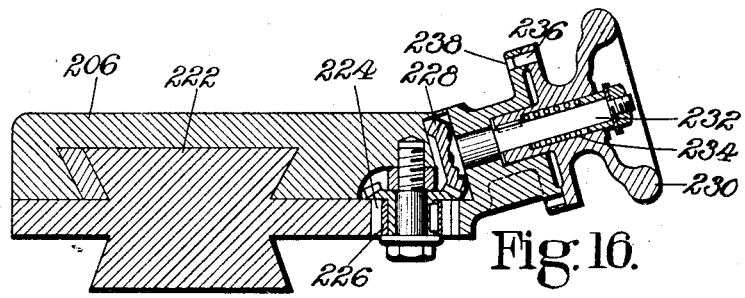
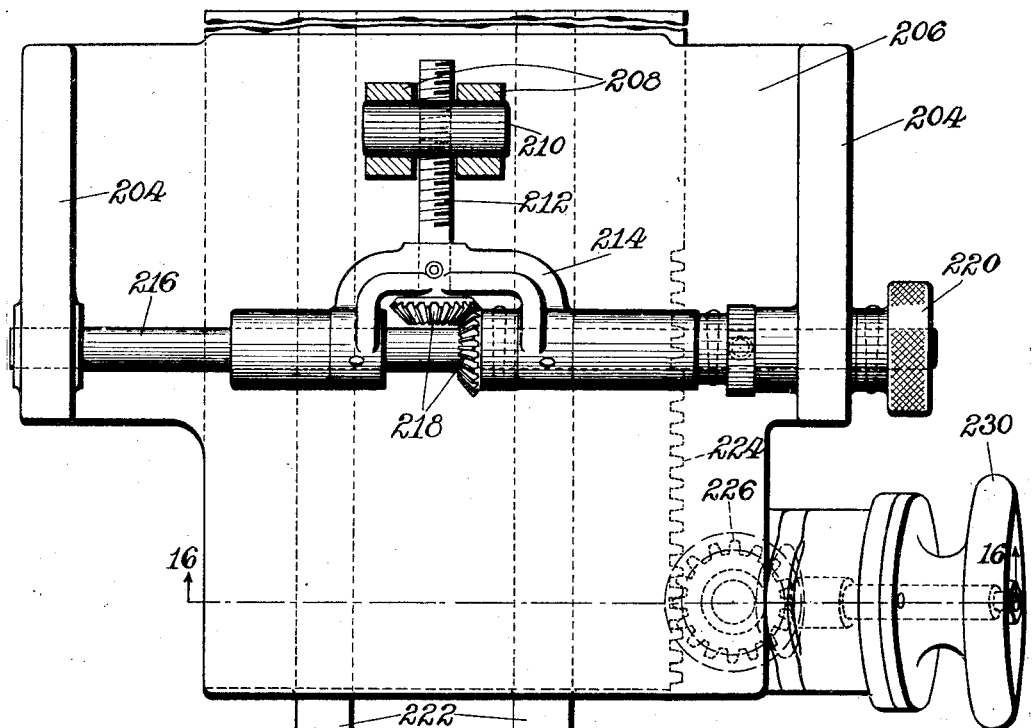
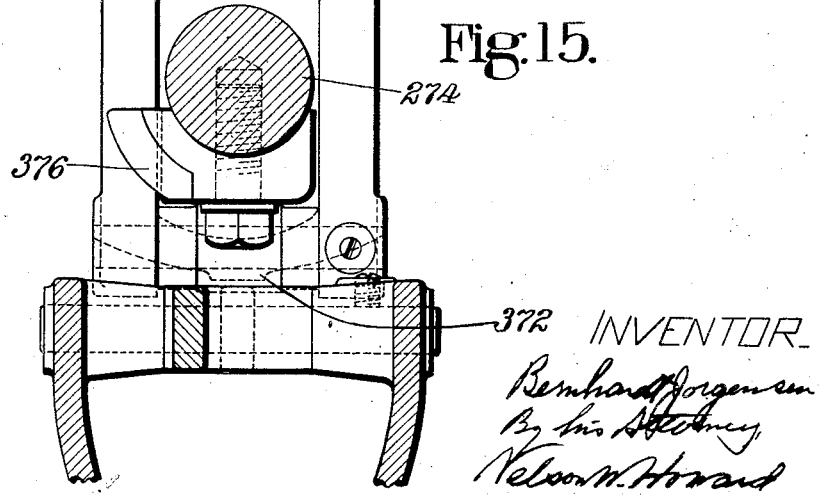

July 30, 1929.　　　　B. JORGENSEN　　　　1,722,499
LASTING MACHINE
Filed Nov. 13, 1923　　　　12 Sheets-Sheet 11

INVENTOR.
Bernhard Jorgensen
By his Attorney,
Nelson W. Howard

July 30, 1929.  B. JORGENSEN  1,722,499
LASTING MACHINE
Filed Nov. 13, 1923  12 Sheets-Sheet 12

INVENTOR.
Bernhard Jorgensen
By his Attorney,

Patented July 30, 1929.

1,722,499

UNITED STATES PATENT OFFICE.

BERNHARDT JORGENSEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

LASTING MACHINE.

Application filed November 13, 1923. Serial No. 674,545.

This invention relates to machines for lasting shoes. It is one important object of the invention to provide a machine for lasting shoes of a special type, of which tennis shoes are a well-known example, this type of shoe usually having an upper made wholly or in part of textile fabric and fastened to the insole in the lasting of the shoe by the use of cement. The invention is accordingly herein illustrated in its application to the lasting of tennis shoes; but it will be recognized that in many of its novel aspects the invention is not limited in utility to the manufacture of shoes of that particular type.

In the manufacture of shoes of the above-mentioned type it has been the general practice heretofore to perform the lasting operation by hand. Machinery designed for leather shoe lasting is, in general, not well adapted for lasting this type of shoe, not only by reason of the different manner in which the upper is customarily fastened to the insole, but also because of the difference in the character of the shoe materials and the correspondingly different treatment that they require. Furthermore, the strength and skill required in the lasting of this kind of shoe by hand are not so great as to prevent the lasting from being performed at a comparatively low labor cost. It is nevertheless recognized that uniformly better work and more rapid production could be obtained by the use of suitable machinery.

It is an object of the present invention to provide a lasting machine adapted to the requirements of tennis shoe lasting, and so constructed as to last shoes of this general type more rapidly and economically than heretofore, as well as more satisfactorily. Shoes of this kind are comparatively low-cost shoes, and for this and other reasons it is desirable that the entire shoe be lasted in one machine. The invention, in one of its important aspects, accordingly provides a machine for lasting the entire shoe, and important novel features are to be recognized in the general organization of means for accomplishing this result.

In the construction of a lasting machine which includes in its organization both end lasting means and side lasting means, or which is so designed as to last the entire shoe as herein shown, an important problem to be dealt with is the variation in length between different sizes of shoes, since it is necessary to the practical success of such a machine that the different mechanisms shall operate in proper relation to each other upon shoes of different sizes and also that the change may be made from one size of shoe to another without the necessity for the operator to spend any considerable amount of time in adjusting the machine. The present invention, in one of its important features, provides a machine in the use of which the operator is relieved of any concern as to the action of the side lasting means in changing from one size of shoe to another, the machine herein shown having side lasting means which varies its range of action lengthwise of the shoe in accordance with the length of the shoe. More particularly, the machine herein illustrated is provided with toe and heel end lasting mechanisms one of which may be readily and quickly adjusted relatively to the other for different lengths of shoes, together with opposite side lasting mechanisms having a range of action lengthwise of the shoe determined by the position of the adjustable end lasting mechanism, so as to complete the lasting of the shoe between the portions which are operated upon by the toe and heel end mechanisms whatever may be the length of the shoe.

In a further important and novel aspect, the invention provides, in combination with end lasting means, side lasting means which operates progressively lengthwise of the shoe. In the construction shown, the side lasting means receives a positioning movement lengthwise of the shoe between successive operations on the shoe; and it is by varying the extent of such positioning movement that the range of action of the side lasting means is varied for different lengths of shoes as above explained.

It is a further very desirable characteristic of the machine herein shown that the lasting of the shoe in the shank adjacent to the heel end is completed prior to the lasting of the heel end portion. It is a well-known fact that in the manufacture of shoes which are provided with heel end stiffeners or counters there is danger that in the lasting of the heel end of the shoe the counter will be tipped so as to displace in an undesirable manner its front end portions or wings. In the machine herein illustrated the side lasting mechanisms operate far enough rearwardly to engage portions of the upper at or near the points where the front ends of the counter are located, and by so timing the operations that the side lasting mechanisms lay the margin of the upper inwardly over the insole and press it into position to adhere to the insole through the action of the cement prior to the operation of the heel end lasting means, assurance is afforded that the wings of the counter will be properly positioned and held from displacement when the heel end of the shoe is lasted.

Features of novelty are also to be recognized in the side lasting means, including both the novel arrangement whereby side lasting mechanism comprising a series of shoe-conforming devices is operated successively in different locations lengthwise of the shoe, and details of construction of the lasting mechanism. In the construction shown each of the opposite side lasting mechanisms comprises a plurality of flexible lasting straps utilized both to upwipe the upper and to lay its margin inwardly over the insole, together with spring controlled members for pressing the straps against the side of the shoe, the arrangement being such that the straps assume relative positions corresponding to the lengthwise contour of the shoe. For laying the margin of the upper inwardly and for pressing it into position to adhere to the insole, the straps are operated upon by overlaying members to which inward movement is imparted yieldingly, these members being pulled toward the bottom face of the insole by the resistance of the straps as the upper is folded inwardly over the insole.

In conformity with present practice in the manufacture of tennis shoes and shoes of like characteristics, the work will not come to the lasting machine with the upper and the insole assembled on the last. On the contrary, the operator of the lasting machine will assemble the upper and the last as he presents the work to the machine and will position the upper in the correct relation to the last prior to the lasting operation. For holding the upper in proper relation to the last, the machine herein shown is provided with a heel embracing clamp or band which is applied to the shoe by spring means released by the operator before the machine is started. This leaves the operator free to position the insole on the bottom of the last; and a further advantageous characteristic of the machine is that manually-operated means is provided for clamping the insole so that the operator may be sure that the insole is properly positioned before the machine goes forward with its operations. In the construction shown the insole is thus clamped by members that are operated subsequently by power to depress the shoe; and the starting treadle is utilied to move these members to clamping position and is operative by further movement to start the machine. The machine is also provided with means for gaging the height of the last to insure the proper correlation between the clamping of the insole and the starting of the power operation of the machine.

In the means for lasting the heel end of the shoe the invention presents features of novelty in the control of the wipers. In the construction shown the wipers are carried by the heel band support and are brought forwardly with the band as the band is applied to the shoe in the manner hereinbefore explained. Both the band and the wipers are thus maintained initially in such relation to the support as to afford ample room for presenting the work and for positioning the upper properly on the last. It is also important that the wipers be positioned in such relation to the plane of the insole as to insure against displacement of the insole as they are advanced and closed, and to this end the machine illustrated has means for upholding the wipers yieldingly, together with means supported independently of the wipers for depressing them to a position determined by a gage member in contact with the bottom face of the insole. Conveniently this gage member serves also to clamp the heel end of the insole on the last and to depress the shoe, as hereinbefore explained; and at a predetermined time in the cycle the gage member is released, permitting the shoe with its heel band to be forced up toward the wipers to increase the pressure of the wipers on the margin of the upper for cementing the margin firmly to the insole.

For lasting the toe end of the shoe the machine herein shown has toe embracing wipers of novel construction, and a novel organization comprising an apron of flexible sheet material, herein shown as rubber, extending over the edges of the wipers, with a yieldable toe pad for pressing the apron against the upper below the wipers. By relative movement of this toe last mechanism and the shoe in the direction of the height of the shoe, herein shown as effected by depressing the shoe together with the heel band and the heel wipers relatively to the toe lasting means, the apron is made to act on the upper to draw it tight across the forepart of the last and also forwardly on the last and to work the upper to the edge of the insole about the toe, after which the wipers act through the apron to lay the upper over the insole. For better insurance of applying to the upper the proper degree of lengthwise pull the machine is further provided with means for imparting to the toe lasting mechanism a forward movement in time relation to the unwiping of the upper.

The above and other features of the invention, together with various novel details of construction and combinations of parts, will now be more particularly described by reference to the accompanying drawings and pointed out in the claims.

In the drawings,

Fig. 5 is a section on the line 5—5 of Fig. 4 continued upwardly through the machine;

Fig. 6 is a view in front elevation of a portion of the heel end lasting means and the shoe support and heel band;

Fig. 7 is a right-hand elevation of a portion of the structure shown in Fig. 6;

Fig. 8 is a view in end elevation, and partly in vertical section, showing more in detail the shoe supporting and gaging mechanisms;

Fig. 9 is a fragmentary view illustrating the relation of the preliminary gaging means to the shoe;

Figure 1:
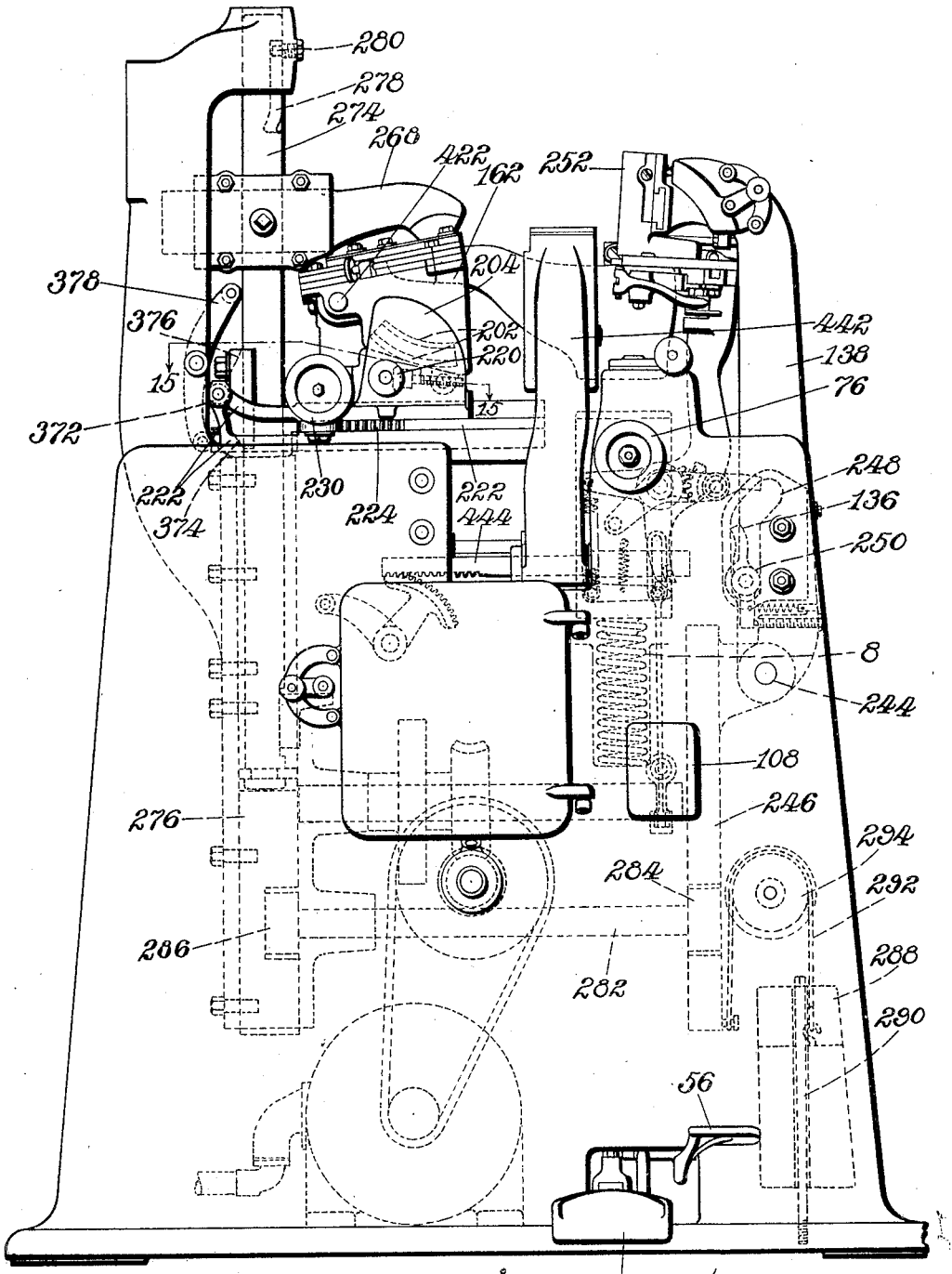
Fig. 1 is a view in front elevation of a machine in which the invention is embodied, as it appears at an intermediate stage in the cycle of operations.
Figure 4:
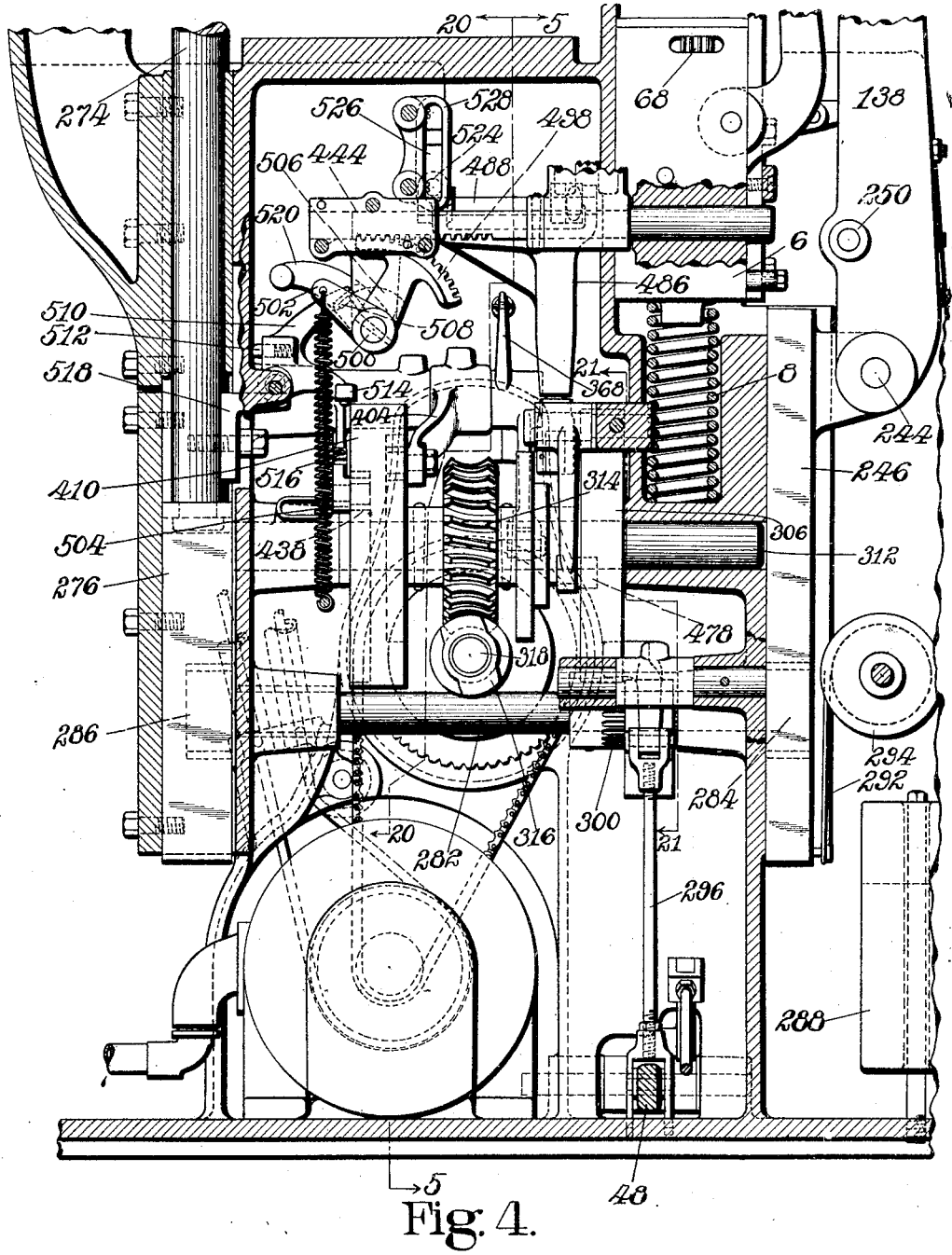
Fig. 4 is a view, partly in front elevation and partly in vertical section, of the lower portion of the machine on an enlarged scale.
Figure 10:
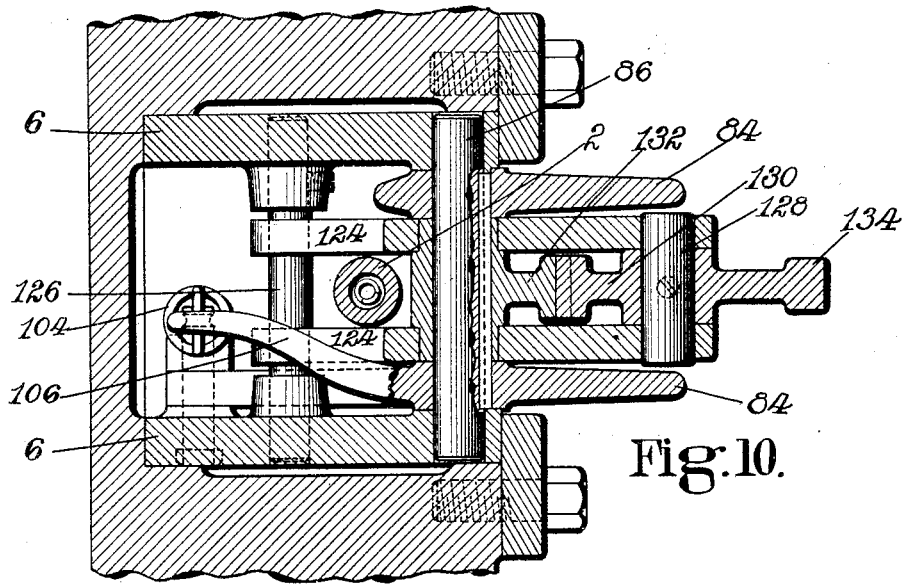
Figure 20:
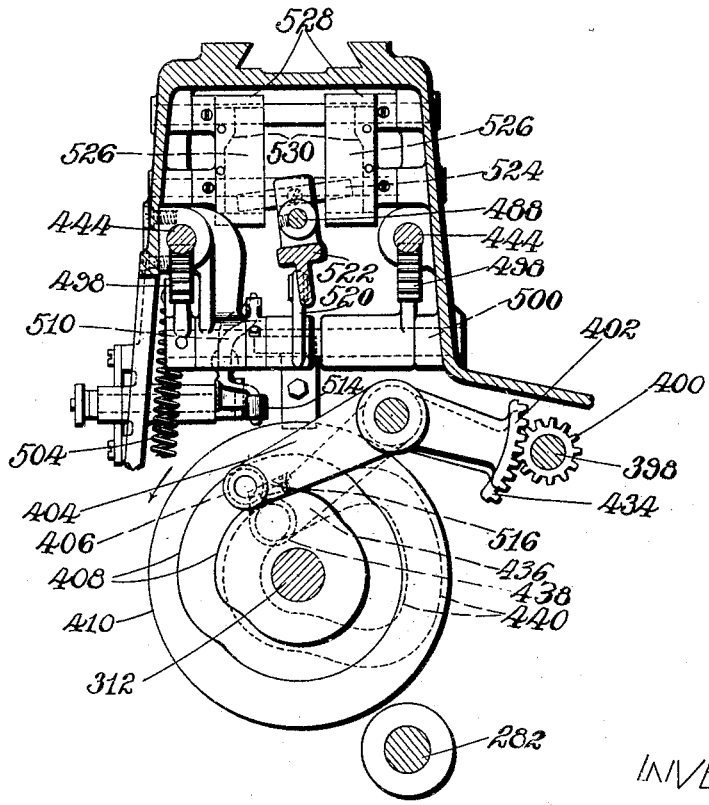
Figure 17:
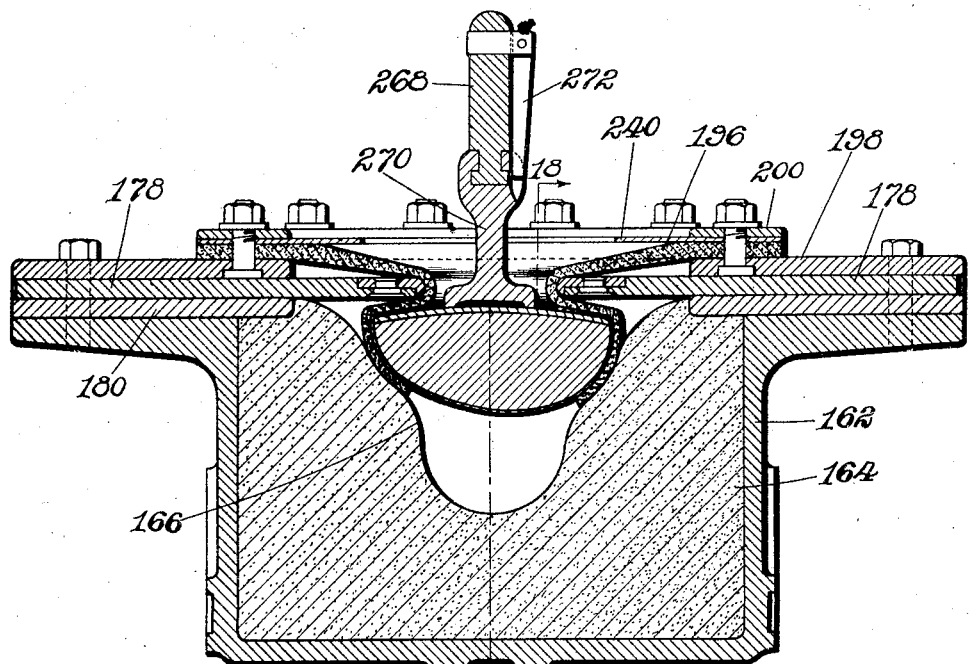
Figure 18:
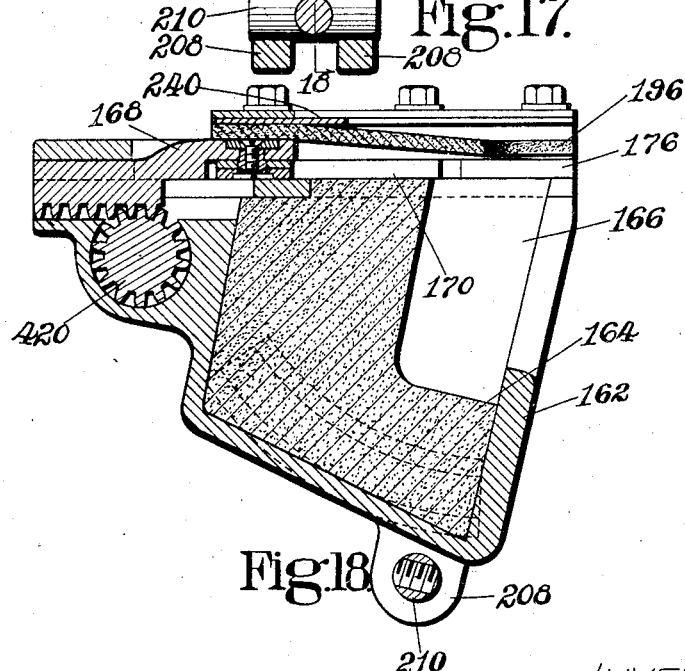
Figure 19:
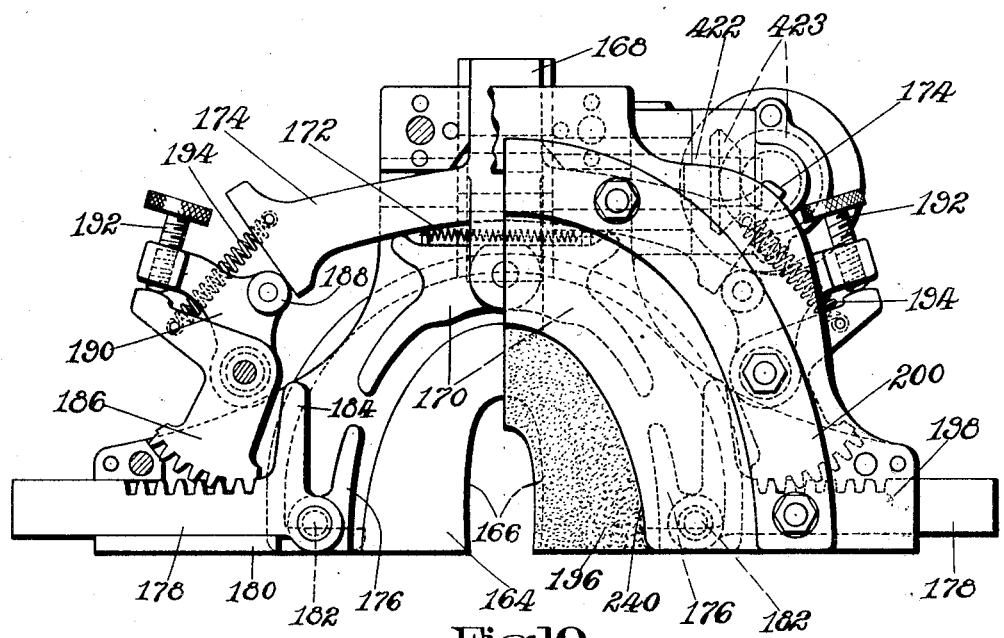

Fig. 9ª is a view at right angles to Fig. 9;

Fig. 10 is a section on the line 10—10 of Fig. 6, on an enlarged scale;

Fig. 11 is a plan view of the heel wipers and the heel band, with parts in section on the line 11—11 of Fig. 6;

Fig. 12 is a section on the line 12—12 of Fig. 11;

Fig. 13 is a section on the line 13—13 of Fig. 12;

Fig. 14 is a view in end elevation of the depressing and gaging means for the heel end of the shoe;

Fig. 15 is a section on the line 15—15 of Fig. 1, on an enlarged scale;

Fig. 16 is a section on the line 16—16 of Fig. 15;

Fig. 17 is a vertical, transverse section through the forepart lasting mechanism with the parts positioned as they appear substantially at the end of the toe lasting operation;

Fig. 18 is a section on the line 18—18 of Fig. 17 with the parts differently positioned;

Fig. 19 is a plan view of the toe wipers and the parts closely associated therewith, portions of the structure being broken away;

Fig. 20 is a section on the line 20—20 of Fig. 4, looking in the opposite direction from the section of Fig. 5;

Fig. 21 is a section on the line 21—21 of Fig. 4; and

Figure 22:
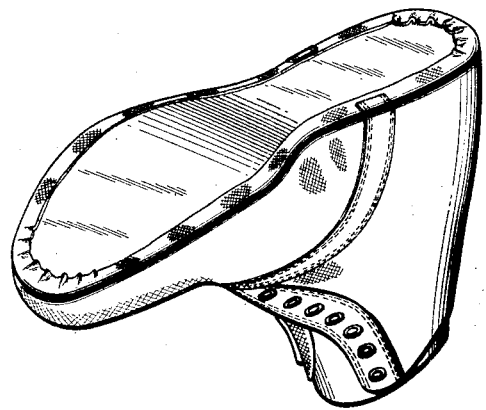

Fig. 22 shows a shoe lasted by the machine.

The last with its upper loosely mounted thereon is supported for the operation of the machine by a heel post 2 (Figs. 6 and 8) which is vertically movable in a slide 4 mounted for movement in directions lengthwise of the shoe in the upper end of a vertically movable supporting slide 6, the latter being upheld by a comparatively strong spring 8 and having a stop member 10 which engages a cross-bar 12 on the frame to limit its upward movement. The slide 4 carries a bracket 14 which supports the lower end of a comparatively light spring 16 extending upwardly within and supporting the heel post 2. When the shoe is mounted on the heel post the shoe and the post are depressed relatively to the slide 6 against the resistance of the spring 16 to position the bottom of the shoe in a predetermined plane. To hold the heel post in any position to which it is depressed, a pawl 18 is provided engaging ratchet teeth 20 on the side of the post and held by a spring 22 in engagement with the teeth. While these ratchet teeth face downwardly, the spring 16 is sufficiently light to permit the pawl, under the influence of its spring 22, to hold the heel post from upward movement as well as from downward movement. If the heel post is too low, the operator may move it upwardly while the pawl remains in engagement with the teeth. To permit the depression of the post from a position higher than desired, a plunger 24 is provided with its inner end in position to engage an arm 26 fast on a rock shaft 28 on which the pawl 18 also is mounted. When the operator pushes the plunger 24 inwardly, the pawl is thus moved into position to release the heel post, and the latter may then be moved downwardly as desired.

Since it is desirable that the height of the bottom of the last be determined with substantial accuracy prior to the operation of the machine, and since different sizes and styles of lasts vary in height, the machine is provided with gaging mechanism which may be conveniently utilized in changing from one size or style to another. This mechanism comprises a gage arm 30 curved as shown in Figs. 8 and 9 and having a roll 32 for engaging the heel end portion of the last. The arm 30 is pivoted at 34 on the rear of the frame of the machine, and is provided with a short arm 36 having a roll 38 in position to be engaged by a wedge cam 40 on a slide 42. It will thus be seen that upon downward movement of the slide 42 the cam 40 acts to swing the arm 30 over the shoe and downwardly to a predetermined position, depressing the shoe and the heel post against the resistance of the spring 16. The slide 42 is connected by a link 44 to a bell-crank 46 conveniently mounted on a treadle arm 48 hereinafter referred to as means for starting the machine. The bell-crank 46 is connected by a link 50 to an arm 52 fast on a rock shaft 54 on which is secured a treadle 56 for operating the gage. Movement of the treadle 56 is limited by engagement of one arm of the bell-crank 46 with the treadle 48, so that the roll 32 will depress each shoe to the same vertical position. When the treadle 56 is released the gage is moved to its inoperative position by a spring 60, which is connected both to the link 44 and to the arm 30 so that it serves to return the cam 40 as well as the arm, and the heel post 2 is then retained by the pawl 18 in the position determined by the gage.

It is desired to guard against starting the machine when the gage is in its operative position, in order to avoid danger of breaking the parts. The arm 52 is accordingly provided on one side with a lug 62 which, upon movement of the treadle 56, is swung under a block 64 on the starting treadle 48, so that the latter cannot be depressed until after the gage has been returned.

As already mentioned, the heel post supporting slide 4 is mounted for movement lengthwise of the shoe in the vertically movable slide 6, and such movement is utilized to position the post differently for different sizes of shoes. For effecting the adjustment of the slide 4, it is provided on its front side with a series of gear teeth 66 engaged by a pinion 68 mounted on the slide 6, this pinion being engaged in turn by a vertically elongated pinion 70 mounted on the frame of the machine. The pinion 70 is connected by beveled gearing 72 to a shaft 74. On the shaft 74 is an operating hand wheel 76 which is keyed to the shaft and is movable lengthwise thereon against the resistance of a spring 78. The hand wheel 76 carries a pin 80 arranged to enter any one of a plurality of recesses formed in the frame adjacent to the hand wheel to hold the parts in adjusted position. When the operator desires to adjust the heel post for the length of shoe to be operated upon he pulls out on the hand wheel 76, turns it in the desired direction, and then releases it to permit the pin 80 to enter the appropriate locking recess. It will be understood that by reason of the length of the pinion 70 the pinion 68 remains continuously in engagement therewith irrespective of the vertical movement of the slide 6.

To assist in determining the proper adjustment of the slide 4, the gage arm 30 is further provided with a gage member 82 which projects rearwardly therefrom and extends downwardly to a position adjacent to the bottom of the shoe, as shown in Fig. 9a. The operator will, therefore, conveniently adjust the slide 4 while the gage 30 is in operative position, the roll 32 permitting the shoe to be readily moved lengthwise by the slide, and the purpose and effect of the gage 82 is to indicate the proper position of the rear end face of the shoe. It will be seen that shoes of different sizes and styles will thus be positioned with their rear end faces in the same location.

After mounting the last and the upper on the heel post 2 and after adjusting the upper with respect to the position of its back seam and to the distance which its margin projects above the bottom of the last at the heel end, the operator causes the upper to be clamped about the heel end of the last to conform it to the contour of the last and to hold it for subsequent operations. The clamping means comprising an arm 84 (Fig. 6) which is keyed to a rock shaft 86 mounted to turn in bearings in the two opposite sides of the slide 6 (Fig. 10). Pivotally mounted on the upper end of the arm 84 are arms 88 (Figs. 6 and 11) supporting on their front ends the opposite ends of a heel band chain 90, which may be constructed as common heretofore in lasting machines, this chain being faced by a flexible leather pad 92 for engagement with the shoe. The arms 88 have on their rear ends intermeshing gear sectors 94 which insure that the arms will swing inwardly or outwardly in unison. The chain 90 has at its intermediate portion an extension 96 (Fig. 12) which rests on a shelf formed by the arm 84 to assist in supporting the heel band. It will be understood that pressure of the shoe against the intermediate portion of the band will cause the arms 88 to swing inwardly and thus to wrap the band about the heel end of the shoe.

At the time when the operator mounts the shoe on the heel post the arm 84 is held in an inoperative position so that the heel band does not interfere with the positioning of the shoe. For this purpose the slide 6 carries a pawl 98 pulled upwardly by a spring 100 and arranged to engage a wear plate 102 mounted on a downward extension of the arm 84 to hold the arm in its outwardly swung position. Upon downward movement of the pawl 98, a spring 104, connected to a forwardly extending arm 106 on the arm 84, serves to swing the arm 84 toward the shoe and thus to apply the heel band to the shoe. In the construction shown the pawl 98 is depressed by the operator through the use of a knee-plunger 108 connected to a bell-crank 110 (Fig. 8) one arm of which is connected to a link 112 provided with a loop-shaped upper end to embrace a pin 114 on the pawl 98. It will be understood that, as the parts are shown in Fig. 6, the slide 6 and the shoe have been depressed by the operation of the machine, as hereinafter more fully explained, from the position which they occupy at the time when the arm 84 is released to clamp the shoe, the pin 114 being at that time near the upper end of the loop in the link 112 as illustrated in Fig. 8.

While it is usually desirable that the clamping means shall be thus rendered operative manually prior to the depression of the starting treadle 48 in order, for example, that on some kinds of work the insole may then be positioned on the bottom of the last by the operator prior to starting the machine, the machine is further provided with means for releasing the arm 84 by the action of the starting treadle if it has not already been released by the action of the plunger 108. This is largely for the purpose of safety, in view of danger of breaking parts of the machine if the machine is operated under power before the clamping means is tripped. For the purpose in view there is connected to the starting treadle 48 a rod 116 provided with a shouldered head 118 for engagement with the upper surface of a plate 120 on the bell-crank 110. A spring 122 holds this head in operative position. It will thus be seen that at the beginning of the downward movement of the starting treadle the link 112 will be pulled downwardly and will depress the pawl 98 to release or trip the arm 84 if the arm has not previously been released.

It may be conveniently explained at this point that to withdraw the heel band from the shoe after the lasting operations have been performed the arm 84 is returned automatically to a position where it is held by the pawl 98. For this purpose there are provided (Figs. 6 and 10) a pair of supporting arms 124 positioned partly by the rock shaft 86 and partly by a fixed pin 126 on the slide 6, and at the outer ends of these arms is mounted a short rock shaft 128 to which is fixed a gear sector 130 engaging another gear sector 132 which is keyed to the rock shaft 86 to move with the arm 84. The gear sector 130 has a projecting arm 134 arranged to be engaged by a finger 136 on an arm 138 which in the return of the parts of the machine to starting position has an upward and outward swinging movement, as hereinafter more particularly described. When the arm 134 is thus swung upwardly it acts through the gear sectors 130 and 132 to swing the arm 84 outwardly away from the shoe to a position in which it is latched by the pawl 98. The finger 136 slips past the arm 134 after the arm 84 has been caught by the pawl. In order to avoid breakage of the parts when the arm 138 moves downwardly and inwardly, the finger 136 is pivotally mounted on the arm and is controlled by a spring 140 which permits it to yield.

For gathering and bending the margin of the upper inwardly and for pressing it down at the heel end of the shoe, heel embracing wipers 142 (Fig. 11) are provided, these wipers being supported on the arm 84 so that they are maintained in predetermined relation to the heel band and are swung inwardly when the band is applied to the shoe. These wipers are centrally pivoted at 144 on a slide 146 which is movable lengthwise of the shoe to advance the wipers, this slide being mounted in a slideway formed on the head of a vertically movable plunger 148 (Fig. 13) upheld by a spring 150 in the arm 84 and limited in its upward movement by the head of a screw 152. The slideway and the side faces of the member 146 mounted therein are curved as illustrated in Fig. 13, so that the slide and the wipers may be rocked or tipped laterally of the shoe. Engaging the lower faces of the wipers near their front ends are spring plungers 154 in the arms 88, similar to the plunger 148 and similarly controlled, the wipers thus being yieldably supported at three points so that they may be rocked or tipped laterally or lengthwise of the shoe and depressed bodily, the lengthwise tipping being permitted by suitable enlargement of the guideways in which the plunger 148 and the screw 152 are mounted. It will be understood that the wipers are thus supported initially in a higher plane than their operating plane, and they are depressed and positioned as determined by each particular shoe in a manner more particularly hereinafter explained.

The wipers are advanced by forward movement of the slide 146 through mechanism also more particularly hereinafter described, and as they are thus advanced they are closed laterally of the shoe by the action of pins 156 which are supported on the arm 84 and project within slots formed in rearward extensions 158 of the wipers. These pins carry rolls 160 the diameter of which is somewhat less than the width of the slots in the members 158 to permit the tipping of the wipers as above described. The pins 156 are adjustable on the arm 84, as shown in Fig. 13, so that the limit of closing movement of each of the wipers may be determined independently of that of the other. It is preferred that the heel wipers shall not operate directly upon the upper materials, and the heel band 92 is accordingly provided with a flexible upward extension which lies between the edges of the wipers and the upper materials and through which the wipers act upon the upper.

For lasting the forepart of the shoe there is provided means for drawing and working the upper lengthwise and upwardly about the forepart of the last and for gathering and laying its margin inwardly and pressing it into adhering relative to the insole. As shown in Figs. 1, 17 and 18, the machine has a combined toe pad box and wiper support 162, and mounted within this box is a toe pad comprising a block of soft rubber 164 having a substantially U-shaped recess or opening 166 formed therein somewhat similar in horizontal contour to the corresponding contour of the forepart of the shoe, although smaller, as illustrated in Fig. 19. Mounted on the box 162 for movement lengthwise of the shoe is a slide 168 on the front end of which are pivotally mounted a pair of curved wiper members 170 for embracing the toe end of the shoe, these members being held normally in open position as illustrated in Fig. 19 by a spring 172 connected to pins on the members. The slide 168 has laterally extending arms 174 which limit the opening movement of the wipers 170.

It will be seen that the wiper members 170 act only about the end and corners of the toe. For operating farther rearwardly at the sides of the forepart additional wiper members 176 are provided which are mounted on slides 178 movable in guideways in a plate 180 on the box 162. The members 176 are pivoted at 182 on the slides 178 so that they may turn to a limited extent about axes extending heightwise of the shoe. In locations spaced from the members 176 the slides 178 have wiper closing fingers 184 between which and the members 176 is a recess to receive and interlock with the front ends of the wiper members 170, the latter being recessed to receive the members 176 so that the inner edges of the members 170 and 176 will be substantially in alinement when the wipers are closed. Inward movement is imparted to the slides 178 by gear sectors 186 which engage rack teeth on the slides and are swung about their pivots by the action of the arms 174 of the slide 168. The end faces of the arms, which are inclined relatively to the length of the shoe, engage rolls 188 mounted on members 190 which are pivoted on the same axes as the gear sectors 186 and are provided with screws 192 engaging offset arms of the gear sectors, springs 194 being provided to connect the arms 174 to the gear sectors for holding the slides 178 normally in their outer positions. It will thus be understood that as the slide 168 is advanced to move the wipers 170 lengthwise of the shoe, it acts also to impart inward movement to the wiper members 176, the arrangement being such that the ends of the wipers 170 are advanced into the recesses between the members 176 and the fingers 184 and that these fingers act to impart closing movement to the members 170 about the axis of these members. It will be noted that in this arrangement the wiper members 176 have no movement lengthwise of the shoe, and that these members and the members 170 are in such relation to the shoe that their wiping edges act on the upper materials in directions substantially perpendicular to the edge of the shoe bottom at all points about the toe, without danger of crowding the upper at the sides of the toe backwardly in such manner as to form objectionable wrinkles. By adjusting the screws 192 the slides 178 may be moved in or out, independently of each other, and the inner limit of movement of the wipers at either or both sides of the toe may thus be varied.

In the machine shown the toe wipers do not operate directly upon the upper materials, but indirectly through a rubber apron 196 which is secured or clamped to a cover plate 198 over the wipers by means of a curved clamping plate 200. At its inner edge this apron is recessed similarly to the toe pad 164, but it is sufficiently wide to project over the edges of the wipers and to lie between the shoe and the toe pad 164 as the shoe is depressed. When the wipers are advanced and closed after depression of the shoe they further stretch the rubber apron with a drawing effect on the upper materials and thereby gather and lay the margin of the upper materials inwardly over the insole.

The toe pad box 162 is supported on curved guideways 202 (Fig. 1) formed on plates 204 that extend upwardly from a bed plate 206 (Figs. 15 and 16). On these guideways the box may be tipped to adjust the wipers to the lengthwise inclination of the forepart of the shoe bottom. For effecting this adjustment the box has depending lugs 208 in which is journaled a pin 210 having a threaded opening to receive a screw 212, this screw having a bearing in a bracket 214 mounted on a shaft 216 which is rotatable in the plates 204. By beveled gearing 218 the screw 212 is connected to the shaft 216, and the latter is provided with a hand wheel 220 on its outer end for turning it.

The bed plate 206 is in turn mounted on a slide 222 which is movable in directions lengthwise of the shoe in a guideway formed in the frame of the machine. The slide 222 has a movement lengthwise of the shoe in time relation to the operations of other parts of the machine, as more particularly hereinafter explained. In order to adjust the toe pad box 162 for different lengths of shoes, the bed plate 206 is guided for adjustment lengthwise of the slide 222. To effect this adjustment the slide 222 is provided with rack teeth 224 engaged by a pinion 226 which is mounted on the plate 206 and is engaged and operated by a pinion 228 also mounted on this plate. The pinion 228 is turned by means of a hand wheel 230 mounted to move lengthwise of a shaft 232 on which the pinion is secured. A spring 234 normally holds the hand wheel in position for a pin 236 carried thereby to enter one of a series of openings 238 formed in a part of the member 206. When it is desired to adjust the member 206 the operator pulls out on the wheel 230 to disengage its pin from the recess 238 and then turns the wheel in the desired direction and releases it to permit the pin to enter another one of these locking recesses.

Since the edges of the toe wipers are concealed by the apron 196, it is desirable that the operator have something to guide him in adjusting the toe lasting mechanism lengthwise of the shoe to position it properly for the length of the shoe. The machine is accordingly provided with a gage plate 240 having an edge contour similar to that of the wipers and clamped in position above the apron. By reference to Fig. 19 it will be seen that the edge of this gage plate is positioned slightly farther inward than the edges of the wipers when the latter are in open position to allow for the thickness of the rubber apron, and that it indicates substantially where the toe of the shoe should be located as it is depressed.

As will be understood from the foregoing description, when the shoe is mounted on the heel post and its height relatively to the slide 6 is properly gaged, and when the upper is clamped about the last by the application of the heel band, the slide 6 together with the shoe and the heel band are in a position considerably higher than when the toe and heel wipers perform their overlaying operations on the shoe. To bring the shoe down to the proper level for the operation of the wipers, and at the same time to draw or wipe the forepart of the upper about the last by the action of the wipers, the toe pad 164 and the apron 196, the machine is provided with means for engaging the insole on the bottom of the last at the heel end and at the forepart and for depressing the shoe together with the slide 6 and its heel band and heel wipers against the resistance of the spring 8. The depressor for the heel end of the shoe comprises a presser foot member 242 (Figs. 6, 11 and 14) which is supported on the arm 138 previously mentioned. This arm is mounted to swing lengthwise of the shoe on a pin 244 carried by a slide 246 vertically movable in guideways in the frame.

The position of the arm 138 with respect to swinging movement lengthwise of the shoe is controlled by a fixed cam 248 (Fig. 1) engaging a roll 250 on the arm, and it will be understood that initially the arm is swung to the right from the position indicated in Figs. 1 and 6, and also raised, to afford room for the positioning of the shoe. When the slide 246 is moved downwardly, the arm 138 is swung by its cam to position the presser foot 242 over the heel seat, and as the slide continues its downward movement the presser foot is carried into engagement with the insole.

As previously stated, the heel wipers are supported on spring plungers 148 and 154 which position them at an elevation relatively to the heel band greater than the position that they should occupy in laying the upper inwardly over the insole. This is to permit them to be positioned accurately relatively to the plane of the heel seat in operating on each shoe, to insure sufficient clearance between them and the insole to avoid danger of displacing the insole. The presser foot 242 is utilized as a gage to determine the position of these wipers. By reference to Figs. 6 and 14 it will be seen that the presser foot 242 is mounted in a holder 252 which has lateral projections 254 for engaging the front ends of the wipers and rearward projections 256 for engaging them farther rearwardly. When the arm 138 is moved downward these projections engage the wipers before the presser foot engages the insole, to force the wipers downwardly against the resistance of their spring plungers to a plane determined by engagement of the presser foot with the insole. Insurance is thus afforded that the wipers will operate in the desired relation to the plane of the heel seat in the operation of the machine on each shoe. The holder 252 is mounted in a curved guideway 258 in a block 260 so that it may tip laterally of the shoe to equalize the pressures of the wipers at the opposite sides of the heel seat, as hereinafter more fully explained. The block 260 (Fig. 6) is mounted on the arm 138 in a guideway 262 curved about an axis extending laterally of the shoe so that the holder 252 may be tipped lengthwise of the shoe to determine in this respect the plane of the wipers. This adjustment is effected and maintained by an arm 264 operating through a pinion and a curved rack and locked by a spring pin 266 in any position of its adjustment, as will be obvious by reference to Fig. 6.

Figure 2:
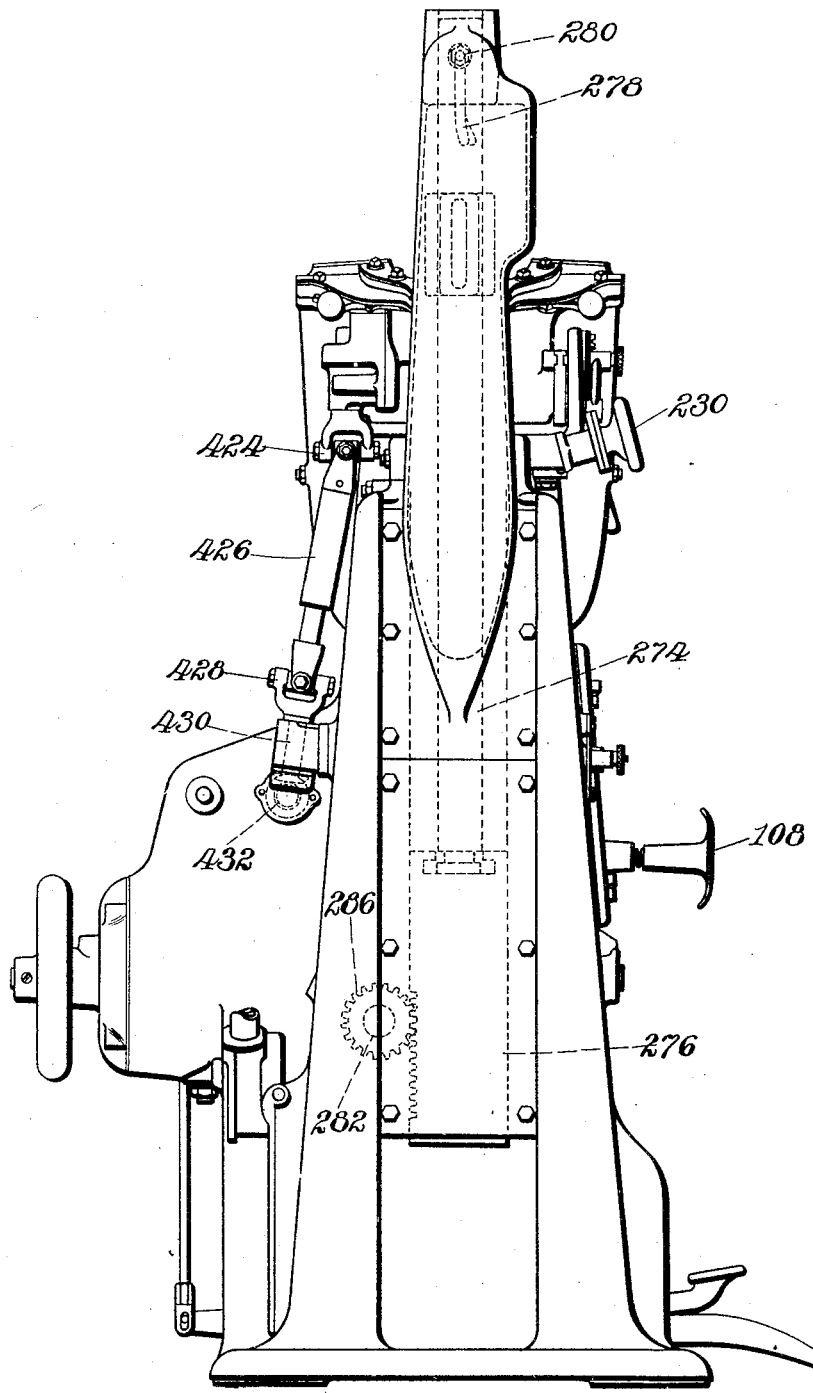
Fig. 2 is a left-hand end elevation of the machine shown in Fig. 1.

The toe or forepart depressor comprises an arm 268 (Figs. 1 and 17) which carries a presser foot 270 adjustable on the arm in a guideway curved about an axis extending laterally of the shoe and held in adjusted position by a leaf spring 272 arranged to enter any one of a series of notches formed in the presser foot member. The arm 268 is adjustable lengthwise of the shoe in a holder secured to a vertically movable rod 274, this rod being mounted also for turning movement and connected at its lower end to a vertically movable slide 276 (Figs. 1, 2 and 4). In the rod 274 is a spiral slot 278 into which projects a fixed pin 280, so that when the arm 268 is in its uppermost position it is swung to the rear to afford an unobstructed space above the shoe when the shoe is positioned in the machine, and when the rod 274 is moved downwardly the presser foot is swung into position over the shoe before it engages the insole.

The toe and heel depressors are connected together, so as to move downwardly in unison, by means of a shaft 282 provided with pinions 284 and 286 engaging rack teeth formed on the slides 246 and 276 respectively. To hold the depressors normally in their uppermost position a weight 288 is provided, this weight being guided for vertical movement on rods 290 and connected to the lower end of the slide 246 by a cord 292 running on a pulley 294.

It is desirable that the presser feet 242 and 270 be moved into clamping engagement with the insole manually rather than by power. This is for the reason that in the type of shoe under consideration the insole is usually not fastened to the bottom of the last, and it is contemplated that in the operation of the machine shown the operator will place the insole in proper position on the last after the upper has been clamped about the heel end of the last by the heel band. The upstanding margin of the upper and the upwardly projecting portion of the heel band will then serve as a convenient guide to determine the proper lengthwise position of the insole. By moving the presser feet then manually to clamping position the operator may be certain that the insole is properly placed and held before the machine goes forward with its operations. Such preliminary movement of the presser feet is conveniently effected in the construction shown by the starting treadle 48 through connections that operate before the treadle becomes effective to start the machine. These connections comprise a link 296 connected to the starting treadle and to a gear sector 298 (Fig. 21) engaging a pinion 300 on the shaft 282. It will be observed that the link 296 at its lower end has a slot 302 (Fig. 8) which embraces a pin 304 adjustably mounted on the starting treadle, so that after the presser feet have been moved down by the treadle they may be further operated through the gear sector 298 to depress the shoe by power, as hereinafter explained. Such power movement is effected by means of a cam wheel 306 (Figs. 4 and 21) provided with a cam groove 308 in which is mounted a roll 310 carried by the gear sector 298. It will be understood that when the manual movement of the presser feet is effected the roll 310 is positioned in an enlarged part $a$ of the cam groove so that the gear sector may be moved the required distance independently of the cam.

The cam wheel 306 is mounted on a cam shaft 312 on which is secured a worm gear 314 engaged by a worm 316 fast on a transverse shaft 318. Mounted to turn about the shaft 318 (Fig. 5) is one member 320 of a cone clutch driven continuously through a chain belt 322 by an electric motor 324. A co-operating clutch member 326 is keyed to the shaft 318 to slide lengthwise thereon between the clutch member 320 on one side and a fixed brake shoe 328 on the other side. A spring 330 tends to force the clutch member 326 into engagement with the member 320. To disconnect the clutch and apply the brake a lever arm 332 fulcrumed at 334 is connected at its lower end to a ring 336 carried by the member 326. To control the arm 332 a horizontally extending lever arm 338 is provided, this arm being fulcrumed at 340 to the lower end of a lever arm 342 which is fulcrumed at 344 on the frame. A spring plunger 346 carried by the arm 342 and engaging the arm 338 tends to swing the left-hand end of the arm 338 upwardly and thus to hold a plate 348 on this arm in front of a lug 350 on the arm 332. To start the machine the arm 338 is swung downwardly about its fulcrum 340 until the plate 348 releases the lug 350, rendering the spring 330 effective to move the member 326 to the right. Such downward movement of the arm 338 is effected by the treadle 48 acting through a link 352 on a lever 354 which has a finger 356 for engaging the top face of a plate 358 on the arm 338. It will be seen that the link 352 at its lower end is provided with a slot 360 which embraces a pin 362 on the rear arm of the treadle to permit the lost motion required for moving down the toe and heel depressors by the action of the treadle before the machine is started, as hereinbefore explained. The arms 342 and 338 are further controlled by a stop cam on the shaft 312 provided with cam projections $b$, $c$ and $d$ for engaging a roll 364 on the lower end of the arm 342. A spring 366 acting on an upwardly extending arm 368 connected to the arm 342 forces the roll 364 toward the stop cam.

It will be understood that in any stopping position of the machine one of the cam projections $b$, $c$ or $d$ acts to hold the arm 338 to the left (Fig. 5) and through engagement of the plate 348 with the lug 350 to hold the clutch member 326 in engagement with the brake 328. When the treadle is depressed the brake is released and the clutch is set by the spring 330, as above explained, and upon the starting of the machine the spring 366 acts on the arm 342 to move the arm 338 to the right until its plate 348 snaps upwardly again in front of the lug 350. Thereafter, when the next projection on the cam arrives in operative position, the clutch is again released and the brake applied. In case the operator should keep his foot on the treadle until the machine arrives at its next stopping point, the machine will nevertheless come to a stop, since upon movement of the arm 338 to the right the plate 358 will slip from under the end of the finger 356. To avoid breakage of the parts under these conditions, the finger 356 is pivoted on its arm 354 and is controlled by a spring plunger 370 which will yield in the movement of the arm 338 to the left.

As the shoe is forced downwardly by power after the starting of the machine, at a predetermined time in the depression of the forepart of the last into the toe lasting mechanism and the consequent drawing of the upper about the toe by the action of the rubber apron 196 and the toe pad 164, a movement toward the left (Fig. 1) is given to the toe lasting mechanism to assist in drawing the upper forwardly on the last and in thus taking up any slack that there may be and in tightening it from the heel end forwardly along the shank portion. For this purpose the slide 222 is provided (Figs. 1 and 15) with a roll 372 engaged by a cam 374 fast on the vertically movable rod 274. This rod carries also another cam face 376 which in the return upward movement of the rod acts on the upper end of a lever arm 378 to swing the lower end of the arm inward in engagement with the slide 222 and thus to return the toe lasting mechanism to its initial position lengthwise of the shoe.

Figure 3:
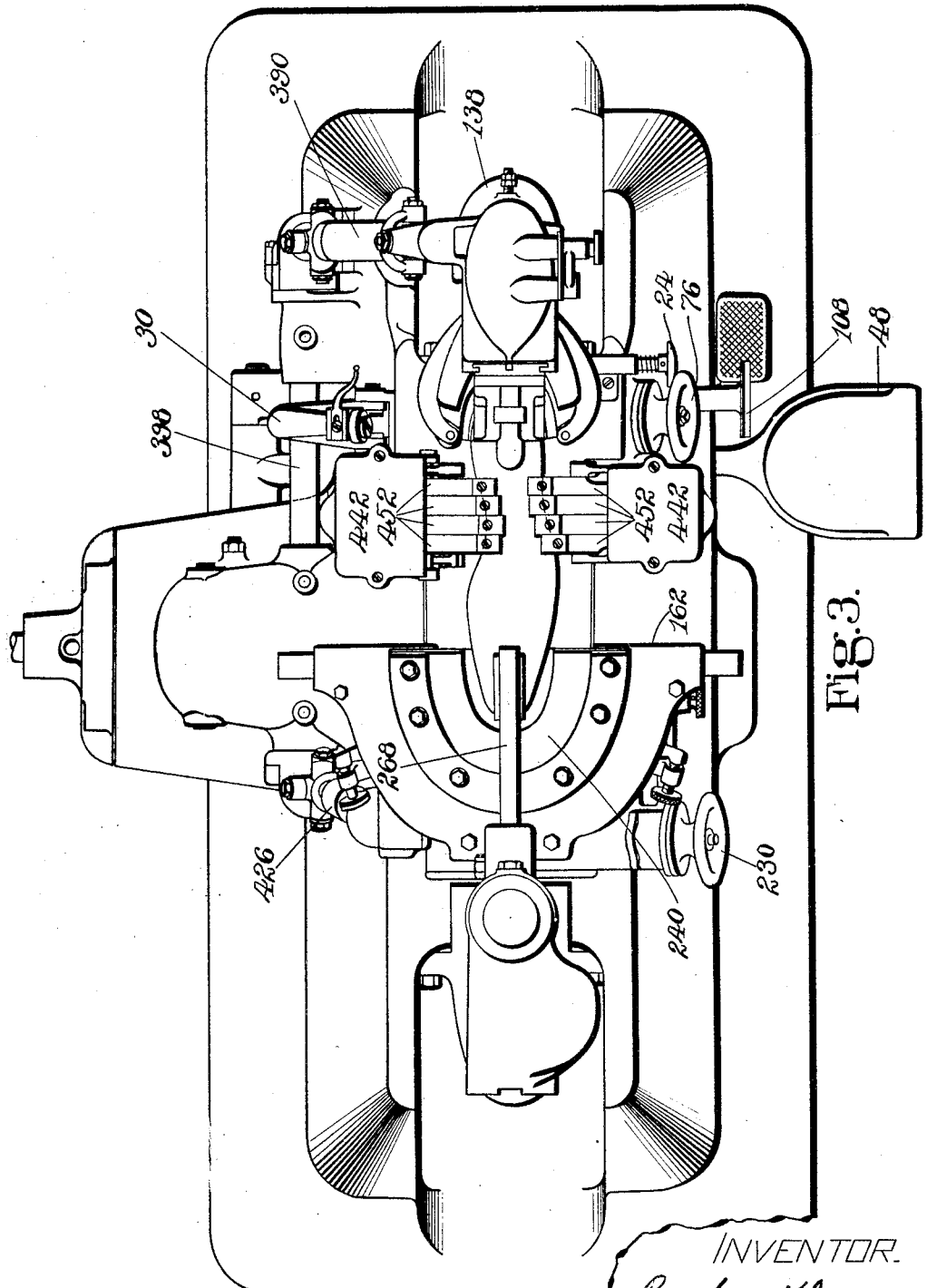
Fig. 3 is a plan view.

Operative movement is imparted to the heel wipers, after the depression of the shoe, by a lever 380 (Fig. 6) which engages the end of the slide 146 to force it inwardly, the rolls 160 acting in such movement of the slide to close the wipers, as hereinbefore described. The arm 380 is mounted on a rod 382 on the arm 138 and is connected by beveled gearing 384 (Fig. 7) to a shaft 386 also mounted on the arm 138. This shaft is connected by a universal joint 388 and a telescopic shaft 390 to a universal joint 392 on the end of a shaft 394 connected in turn by beveled gearing 396 to a shaft 398 (Figs. 3, 7 and 20). The shaft 398 is provided with a pinion 400 engaged by a gear sector 402 which is operated by a lever arm 404 having a roll 406 that lies in a cam groove 408 formed in a cam wheel 410 on the cam shaft 312. To return the heel wipers to open position after they have been operated by their cam, a spring 412 is provided, this spring being connected by a cord 414 guided on a pulley 416 to a pin on the wiper slide 146.

The toe wipers are operated by mechanism similar to that provided for operating the heel wipers. By reference to Fig. 18 it will be seen that the toe wiper slide 168 is provided with rack teeth in engagement with a pinion 420. This pinion is carried by a shaft 422 (Figs. 1 and 19) connected by beveled gearing 423 and by a universal joint 424 (Fig. 2) to a telescopic shaft 426 the lower end of which is connected by a universal joint 428 to a shaft 430 connected by beveled gearing to a shaft 432. The shaft 432 has a pinion engaged by a gear sector 434 (Fig. 20) which is operated by an arm 436 provided with a roll 438 that lies in a cam grove 440 in the cam wheel 410. It will be understood that the toe wipers are returned to open position by their operating mechanism by reason of the connection of the pinion 420 to the slide 168.

For lasting the sides of the shoe, including the portions of the shoe in the shank, the machine is provided with opposite side lasting mechanisms (Figs. 1, 3 and 5) each of which comprises a support or casing 442 mounted to swing toward and from the shoe on a rod 444 which is slidable lengthwise of the shoe for a purpose hereinafter explained, the casings being mounted on the rods to move lengthwise of the shoe with them. Pivotally mounted on the rod 444 within each casing 442 is an arm 446 which in the construction shown serves to control four sets of lasting devices. Each of these sets of lasting devices comprises a strap of flexible material 448, for example leather, secured at its lower end to a support 450 fast on or integral with the casing 442 and secured at its upper end to an overlaying member or slide 452 provided with a slot through which projects a rod 454 carried by the arm 446. Within the slot in each member 452 is a plunger 456 held by a spring 458 in engagement with the rod 454 so that the spring tends to force the overlaying member and the strap 448 inwardly or toward the shoe as far as permitted by the rod 454. A pin 460 on the casing 442 in engagement with inclined lower faces 462 on each group of members 452 serves to raise the inner end portions of these members when the arms 446 are retracted from the shoe, thus holding the straps 448 substantially taut at the time when they engage the shoe. Acting on each strap 448 is a pad 464 of yieldable material, preferably rubber, mounted on the upper end of an arm 466 which is pivoted at 468 on the casing 442 and has a projection engaged by a spring plunger 470 to force the pad 464 toward the shoe. It will be understood that there is a separately controlled arm 466 and rubber pad 464 for each strap 448. A bar 472 on the casing 442 limits outward movement of the arms 466.

The opposite side lasting mechanisms are controlled by a cam groove 474 (Fig. 5) formed in the cam wheel 306, through a bell-crank lever 476 provided on one of its arms with a roll 478 which lies in the cam groove and having its other arm connected to a rod 480 provided with an enlarged head 482 in engagement with a spring 484 mounted in a casing 486 which encircles the rod. The casing 486 at its upper end has a bearing for a horizontal rod 488 on which are mounted a pair of toggle arms 490 the outer ends of which are connected to the arms 446.

A comparatively strong spring 492 connected to the opposite casings 442 tends to swing these casings toward the shoe, and lighter springs 494 tend to pull the arms 446 outwardly into contact with stop screws 496 on the casings 442. Initially the arms 446 are in engagement with the stop screws 496, and through engagement of the arms with these stop screws the casings also are held outwardly away from the shoe by the toggle arms 490. When the cam groove 474 acts to impart downward movement to the rod 480 it causes the spring 492 to swing the casings 442 with their sets of lasting devices toward the shoe, bringing the straps 448 into contact with the shoe under pressure of the pads 464 which yield until stopped by the bars 472. When the resistance of the shoe to inward movement of the casings 442 becomes great enough, the further movement of the rod 480 and the toggle arms 490 swings the arms 446 inwardly away from their stops 496, thus forcing the overlaying members 452 yieldingly inward over the bottom of the shoe. In this movement the resistance or pull of the straps 448 causes the members 452 to be forced down upon the bottom of the shoe, so that these members and the straps lay the margin of the upper inwardly over the insole and press it downwardly into adhering relation to the insole with considerable force. Continuing its action the cam 474 may compress the spring 484 somewhat, as illustrated, thus applying still greater force to the overlaying members.

The machine shown is so constructed that the side lasting mechanisms complete the lasting of the shoe between the portions operated upon by the toe and heel end lasting mechanisms. In order to accommodate the machine to different lengths of shoes the construction is such that the side lasting mechanisms perform the side lasting operation in successive steps, operating first in the shank adjacent to the heel lasting mechanism and then advancing and operating again on the portion of the shoe that remains to be lasted adjacent to the toe lasting mechanism. In view of the inwardly receding curvature of the sides of the last at the shank, especially at the inner side, it is desirable to perform an upwiping operation on the upper in this location before laying its margin inwardly over the insole, and accordingly the machine is so timed that the side lasting mechanisms are moved inwardly to engage the straps 448 with the sides of the shoe under pressure of the blocks 464 during the depression of the shoe. Subsequently by further inward movement they lay the margin of the upper over the insole and press it into adhering relation to the insole when the shoe is substantially in its lowermost position.

Thereafter the side lasting mechanisms are swung outwardly to open position, and they are then advanced toward the toe to repeat their operation on that portion of the shoe which remains to be lasted at the rear of the toe lasting means. To move the side lasting mechanisms forwardly to their second position gear sectors 498 (Figs. 4 and 20) are provided in engagement with rack teeth formed on the rods 444, these gear sectors being fast on a rock shaft 500 on which is an arm 502 connected to a spring 504, this spring acting, when permitted, to impart forward movement to the rods 444 for advancing the side lasting mechanisms toward the toe. To retain these mechanisms in their first position a segment 506 fast on the rock shaft 500 is engaged by a stop 508 on an arm 510 which is pivoted on the frame and held by a spring plunger 512 in locking relation to the segment 506. The arm 510 is provided with a lug 514 in position to be engaged and lifted by a plate 516 on the arm 436 hereinbefore described as a part of the means for operating the toe wipers. It will thus be seen that the side lasting mechanisms are released to the action of the spring 504 by the toe wiper operating means near the end of the operative movement of the toe wipers. The side lasting mechanisms are then moved forwardly until their casings 442 engage the toe pad box 162 which limits their movement. The cam groove 474 thereafter causes the side lasting mechanisms to repeat their operation adjacent to the toe wipers, as more particularly hereinafter explained. To return the side lasting mechanisms to their starting position lengthwise of the shoe the vertically movable rod 274 carries a bracket 518 which in the upward movement of the rod engages an arm 520 fast on the rock shaft 500 and thereby rocks this shaft to carry the segment 506 into position to be held again by the arm 510.

It will be evident that when the side lasting mechanisms are swung outwardly away from the shoe, the opposite casings 442 and the devices carried thereby might both swing toward the front or toward the rear of the machine and thus interfere with the positioning of the next shoe. The machine is accordingly provided with means for centralizing the opposite side lasting mechanisms when they are in starting position as well as when they are swung outwardly from the shoe preparatory to their advancing movement to their second operative position. To this end, the rod 488 which connects the casing 486 to the toggle arms 490 and along which these arms move when the side lasting mechanisms receive their movement lengthwise of the shoe carries a bracket 522 (Fig. 20) in which is secured a cross bar 524 the opposite ends of which are guided in vertical slots 526 formed in stationary guides 528. Within these slots are cams 530 arranged to be engaged by the ends of the bar 524 when the rod 488 receives its upward movement to withdraw the side lasting mechanisms from the shoe. By this means the rod 488 which connects the toggle arms 490 is centralized and the positions of the side lasting mechanisms are thus determined.

When the shoe is depressed by the heel presser foot 242 and the toe presser foot 270 it is moved to such a position as to insure that when the toe wipers acting through the apron 196 lay the margin of the upper inwardly they will not apply to the marginal portion of the insole such pressure as to displace it on the last, the relation between the heel end of the shoe and its wipers for a similar purpose being determined by the wiper locating block 252 in co-operation with the presser foot 242, as hereinbefore explained. For applying adequate pressure to the margin of the upper at the toe and heel ends to lay it flat and to cement it firmly to the insole, the last is moved upwardly toward the wipers, first at the heel end and later at the toe end. The heel presser foot 242 is mounted for vertical sliding movement in the member 252, and is controlled by a toggle device comprising an arm 532 (Fig. 6) which is pivoted at 534 on the presser foot, and an arm 536 pivoted at 538 on the member 252 and jointed to the arm 532 at 540. A spring 542 connected to the arm 536 tends to hold the toggle straight, so that the presser foot is locked to the member 252. To cause the shoe to be moved upwardly toward the heel wipers the toggle 532, 536 is broken, thereby permitting the spring 8 under the jack slide 6 to act to force the shoe with its heel band upwardly, the wipers being still held from upward movement by the projections 254 and 256 on the member 252. To break the toggle the arm 380, hereinbefore described as means for operating the heel wipers, is utilized, this arm having a lost motion connection through a link 544 with the lower toggle arm 532 so that the toggle is broken and the shoe forced upwardly when the heel wipers have substantially or nearly completed their operative movement. To insure substantially equal pressure of the wipers at opposite sides of the insole, the member 252 is permitted to tip toward one side or the other by sliding in its guideway 258 in response to upward pressure of the shoe against the wipers, leaf springs 546 (Fig. 14) being mounted on the block 260 and engaging opposite sides of the member 252 for normally centralizing it.

When the rear end portion of the shoe is thus moved upwardly, the forepart is still held depressed by the presser foot 270. After the toe wipers have completed their overlaying movement, the slide 276 which carries the toe presser foot, receives a short upward movement by the action of an offset portion 2 of the cam groove 308 (Fig. 21). This permits the yielding toe pad 164 to raise the toe end of the shoe against the toe wipers. It will be evident that the slide 246 controlling the heel wipers is also raised at this time, since it likewise is controlled by the cam 308, but the resulting upward movement of the heel wiper controlling member 252 is accompanied by a corresponding upward movement of the jack post with the shoe and the heel band through the expansion of the spring 8.

After the shoe has thus been moved upwardly, the cam 308 serves to depress it again by moving the slides 246 and 276 downwardly, such depression resulting in relaxing the pressure of the toe wipers on the shoe. After the pressure is thus relaxed the toe wipers are opened to their starting position. It is also desirable that the pressure of the heel wipers on the shoe be relaxed before the heel wipers are retracted, and the opening of the heel wipers is accordingly delayed in the return of the last to starting position until the slide 246 has been moved upwardly far enough for the member 252 to relax its pressure on the wipers, whereupon the latter are raised by their supporting spring plungers 148 and 154. When the arm 380 is returned to its starting position the spring 542 becomes effective to set the toggle 532, 536 again ready for operation upon the next shoe.

In the operation of the machine the last with its upper is mounted on the heel post, and unless it is substantially certain that the height of the last is the same as the height of the one on which the machine previously operated, its height is gaged by depression of the treadle 56, the heel post being adjusted vertically to the position determined by the gage roll 32. The principal object in such gaging of the work for height is to insure that when the presser feet are moved into engagement with the insole by the operation of the starting treadle, they will not arrive in position to engage the insole either too soon or too late relatively to the point where the starting treadle acts to start the machine. At this time also the lengthwise position of the last will be gaged by reference to the member 82, the heel post being adjusted by operation of the hand wheel 76.

The operator next adjusts the upper on the last in respect to the position of the back seam and the extent to which the upper projects above the bottom of the last, and holds it in this position with its toe end also centralized while he operates the knee plunger 108 to release the heel clamp arm 84. The heel band 90 is applied about the heel end of the shoe by the action of the arm 84, the heel wipers 142 also being swung forwardly by the arm. When the heel band is applied it acts to tip the last forwardly into engagement with the apron 196 which extends over the edges of the toe wipers and above the toe pad 164, thus clamping the upper at the toe sufficiently to hold it from displacement before the machine is started. Prior to this time the toe lasting mechanism will have been adjusted for length, if necessary, by the operation of the hand wheel 230 in accordance with the indication of the gage plate 240.

The operator next places the insole upon the bottom of the last and presses it back against the upstanding margin of the heel end portion of the upper which is partly supported at this time by the upward projection of the heel band 90. After locating the insole in proper position and while holding it the operator depresses the starting treadle 48 sufficiently to swing the toe and heel presser feet 270 and 242 inwardly and to move them downwardly into engagement with the insole. In such downward movement of the heel presser foot the projections 254 and 256 engage the heel wipers and depress them against the resistance of their spring plungers 148 and 154 to a position determined by the heel presser foot in engagement with the insole. If it should be observed at this point that the insole is displaced or not properly positioned, the operator releases the pressure on the treadle, whereupon the weight 288 raises the presser feet, and he then readjusts the insole and depresses the treadle again.

When the insole has been properly positioned and clamped, the starting treadle is further depressed to start the machine. Thereupon the presser feet are operated by power to depress the shoe against the resistance of the heel post supporting spring 8, the heel band and heel wipers being moved downwardly with the shoe without altering their relation to the shoe. In such downward movement of the shoe the upper is acted upon about the toe first in locations where the last slopes inwardly toward the top of the forepart and later adjacent to the edge of the shoe bottom by the rubber apron 196 which is pressed against the shoe both by the toe wipers and by the yieldable toe pad 164, and this apron by its wiping and drawing action on the upper serves to pull and shape the upper tight across the forepart of the last and about the end of the toe and also to draw it forwardly. Near the end of the downward movement of the presser feet the cam 374 acts on the roll 372 to move the toe lasting mechanism forwardly, thus causing the rubber apron 196 to pull the upper still more effectively lengthwise of the last to take up any slack that there may be in the shank and further to tighten it about the heel end of the last. In the downward movement of the shoe the side lasting mechanisms are swung inwardly so that their straps 448 engage the sides of the upper in the shank under pressure of the yielding pads 464, effecting an upwiping action in the shank while bending the upper inwardly toward the edge of the insole.

When the shoe has been depressed to its lowest position, and before the side lasting mechanisms lay the margin of the upper over the insole, the machine is brought to a stop through the action of the stop cam c. This enables the operator to observe whether the marginal portion of the insole lies close to the bottom of the last and, if conditions require it, to depress the margin by the use of his fingers so that it will lie close to the last when the upper is carried inwardly over it and cemented to it.

When the machine is again started the opposite side lasting mechanisms are immediately operated to lay the margin of the upper in the shank portion of the shoe inwardly over the insole and to cement it to the insole before the heel wipers receive their operative movement inwardly over the heel end of the shoe. The side lasting mechanisms operate far enough rearwardly to engage portions of the upper at or near the locations of the front ends or wings of the counter, and an important advantage in this sequence of operations is that the ends of the counter are secured in proper relation to the insole by cementing the margin of the upper to the insole before the pressure of the heel wipers becomes effective with its well-known tendency to tip the counter. By operating the side lasting mechanisms to complete the lasting in the shank prior to the operation of the heel lasting mechanism danger of displacing the counter is thus avoided.

After laying the upper inwardly and pressing it into adhering relation to the insole in the shank, the side lasting mechanisms are swung outwardly to their starting positions, and the heel and toe wipers are operated to lay the margin of the upper inwardly at the opposite ends of the shoe. In the latter part of the closing movement of the toe wipers the plate 516 on the arm 436 engages the lug 514 and releases the side lasting mechanisms to the operation of the spring 504 which acts to move these mechanisms forwardly to their second operating position determined by their engagement with the toe pad box 162. In the latter part of the inward movement of the heel wipers the arm 380 acts to break the toggle 532, 536 and thus to release the heel presser foot, permitting the shoe to be forced up by the spring 8 against the heel wipers to press the margin of the upper down and cement it to the insole. Substantially at the end of the inward movement of the toe wipers the toe presser foot is raised a short distance by the action of the part e of the cam 308, permitting the rubber toe pad 164 to force the toe end of the shoe up against the toe wipers to press down and cement the margin of the upper about the toe. As hereinbefore explained, the heel post also is moved upwardly at this time together with the heel wipers in response to the corresponding upward movement of the slide 246. At this point the machine is again brought to a stop through the action of the cam projection d to insure better adherence of the upper to the insole by a short dwell with the margin of the upper about the toe under pressure.

When the machine is again started the slides 246 and 276 are moved downward a short distance to depress the shoe, so as to avoid objectionable drag on the margin of the upper when the toe wipers are opened. In time relation to this depression of the shoe the opposite side lasting mechanisms are moved inwardly to engage their straps 448 with those portions of the sides of the shoe which remain in unlasted condition, and as the shoe is thus depressed these straps serve to wipe the upper up toward the edge of the insole. Continuing their movement the side lasting mechanisms then lay the margin of the upper over the insole and press it into adhering relation to the insole, thus completing the lasting of the shoe. It will be understood that on some lengths of shoes the side lasting mechanisms in their second operation will overlap portions of the shoe on which they have previously acted, and moreover that in operating on very small shoes these mechanisms will receive but little if any advancing movement between their successive operations on the shoe.

As the side lasting mechanisms complete the lasting of the shoe between the lasted toe portion and the shank, the toe wipers are opened, and thereafter the presser feet are returned to their starting positions. In the latter part of the upward movement of the toe presser foot operating rod 274 its cam 376 acts on the arm 378 to return the toe lasting mechanism to its starting position lengthwise of the shoe, and the side lasting mechanisms also are returned to their first position lengthwise of the shoe by action of the member 518 on the arm 520. After the upward movement of the member 252 releases the pressure of the member on the heel wipers so that they are raised by their springs to relax their pressure on the upper, they also are opened, and the spring 542 is permitted again to straighten the toggle 532, 536 to lock the heel presser foot. In the upward movement of the heel presser foot the member 136 also acts on the arm 134 to open the heel band until it is locked in starting position. The machine is brought to a stop with all parts in starting position by the action of the cam projection $b$ and the shoe is then free to be removed.

It will be understood from the foregoing description that, with different shoes so positioned by reference to the gage 82 that their rear end faces are in the same location, the heel end lasting mechanism will be positioned and will operate always in the same relation to the shank lasting mechanisms; and preferably the heel wipers will be moved far enough forwardly to carry them over portions of the upper previously operated upon by the shank lasting means, thus insuring proper continuity in the lasting along the sides.

Having described the invention, what I claim as new and desire to secure by Letters Patent of the United States is:

1. A machine of the class described having, in combination, mechanism for lasting the toe of a shoe, mechanism for lasting the heel end of the shoe, and side lasting means comprising a plurality of lasting devices for each side of the shoe movable to last the sides of the shoe completely substantially from the field of action of one of said mechanisms to that of the other of said mechanisms while maintaining the same relation to one another lengthwise of the shoe irrespective of the length of the shoe.

2. A machine of the class described having, in combination, toe and heel end lasting mechanisms relatively adjustable for different lengths of shoes, and side lasting means comprising for each side of the shoe a fixed number of lasting devices having a range of action variable for different lengths of shoes while maintaining the same relation to one another lengthwise of the shoe to last the sides of each shoe completely irrespective of its length substantially from the field of action of one of said end lasting mechanisms to that of the other of said mechanisms.

3. A machine of the class described having, in combination, toe and heel end lasting mechanisms relatively adjustable to vary the distance between them for different lengths of shoes, and side lasting means having in the lasting operation an automatically limited range of movement lengthwise of the shoe variable in accordance with such relative adjustment of the end lasting mechanisms.

4. A machine of the class described having, in combination, toe and heel end lasting mechanisms one of which is adjustable toward or from the other for different lengths of shoes, and devices for automatically lasting the opposite sides of the shoe having a range of operative engagement with the upper lengthwise of the shoe determined by the position of said adjustable end lasting mechanism.

5. A machine of the class described having, in combination, toe and heel end lasting mechanisms arranged to be positioned different distances apart for different lengths of shoes, and side lasting means constructed and arranged to vary the extent of its operative engagement with the upper lengthwise of the shoe automatically in accordance with the relative positions of said end lasting mechanisms.

6. A machine of the class described having, in combination, a shoe support, and means for lasting different portions of a shoe on said support comprising an end lasting mechanism and side lasting mechanism relatively movable automatically in the lasting operation to extend the field of action of the one substantially to that of the other irrespective of the length of the shoe.

7. A machine of the class described having, in combination, toe and heel end lasting mechanisms relatively adjustable to vary the distance between them for different lengths of shoes, and side lasting mechanism for lasting the shoe between said end lasting mechanisms, said end and side lasting mechanisms being relatively movable variably in the lasting operation in accordance with the relative adjustment of the end lasting mechanisms to last each shoe throughout substantially its whole length.

8. A machine of the class described having, in combination, toe and heel end lasting mechanisms relatively adjustable to vary the distance between them for different lengths of shoes, and side lasting mechanism arranged to be positioned in the same relation to one of said end lasting mechanisms for operating on shoes of different lengths, said side lasting mechanism being automatically operative to extend its field of action substantially to that of the other end lasting mechanism irrespective of the distance between said end lasting mechanisms.

9. A machine of the class described having, in combination, opposite side lasting mechanisms, a shoe support adjustable to position different sizes of shoes with their heel end faces at the same distance from said side lasting mechanisms, toe lasting mechanism adjustable for shoe length, and automatic means for giving the side lasting mechanisms a range of action lengthwise of the shoe determined by the adjustment of the toe lasting mechanism.

10. A machine of the class described having, in combination, mechanisms for lasting the toe and heel ends and the opposite sides of a shoe, said mechanisms being relatively adjustable for different lengths of shoes and automatically operative by relative movement differing in accordance with such adjustment to last the entire shoe irrespective of its length.

11. A machine of the class described having, in combination, end lasting mechanism and a shoe support relatively adjustable for different lengths of shoes, and side lasting mechanism automatically movable to different operative positions along the shoe and having a range of action lengthwise of the shoe variable in the lasting operation in accordance with such relative adjustment.

12. A machine of the class described having, in combination, an end lasting mechanism and side lasting mechanism relatively adjustable for different lengths of shoes, and automatic means operative in the lasting of a shoe to give said side lasting mechanism a range of action lengthwise of the shoe variable in accordance with such relative adjustment.

13. A machine of the class described having, in combination, toe and heel end lasting mechanisms relatively adjustable to vary the distance between them for different lengths of shoes, and side lasting mechanism having in the lasting operation positioning movement lengthwise of the shoe automatically limited in accordance with the relative adjustment of said end lasting mechanisms.

14. A machine of the class described having, in combination, toe and heel end lasting mechanisms one of which is adjustable toward or from the other for different lengths of shoes, and side lasting mechanism having, between successive operations on the shoe, positioning movement lengthwise of the shoe limited by engagement with said adjustable end lasting mechanism.

15. In a machine of the class described, the combination with a shoe support, and mechanism for lasting an end of a shoe on said support, of side lasting mechanism mounted for movement lengthwise of the shoe to a position determined by said end lasting mechanism, and automatic means for imparting said movement to the side lasting mechanism in the operation of the machine upon a shoe.

16. In a machine of the class described, the combination with a shoe support, of mechanism for lasting an end of a shoe adjustable for different lengths of shoes, side lasting mechanism mounted for movement lengthwise of the shoe to a position determined by said end lasting mechanism, and means for imparting said movement to the side lasting mechanism comprising a yielding element permitting variation in the extent of said movement in accordance with the position of the end lasting mechanism.

17. A machine of the class described having, in combination, means for lasting an end of a shoe at one operation, and means for lasting different portions of the sides of the shoe successively comprising a lasting device movable along the shoe from one operative position to another between successive lasting operations.

18. A machine of the class described having, in combination, means for lasting an end of a shoe, side lasting mechanism, and means for operating said side lasting mechanism to last the side of the shoe in one location and for then advancing it and operating it again to last the side of the shoe in a different location.

19. A machine of the class described having, in combination, means for lasting an end of a shoe, side lasting mechanism, and automatically operating means to move said side lasting mechanism inwardly over the shoe in one location and then to withdraw it and advance it lengthwise of the shoe and move it inwardly over the shoe in a different location.

20. A machine of the class described having, in combination, toe and heel end lasting mechanisms, and side lasting mechanism movable to different positions lengthwise of the shoe between said end lasting mechanisms to last different portions of the sides of the shoe successively.

21. A machine of the class described having, in combination, toe and heel end lasting mechanisms for lasting each end of the shoe at one operation, and means movable along the shoe from one operative position to another for lasting successively different portions of the sides of the shoe between said end lasting mechanisms.

22. A machine of the class described having, in combination, toe and heel end lasting mechanisms, opposite side lasting mechanisms, and automatic means for imparting to the side lasting mechanisms operative movements successively in different locations lengthwise of the shoe to last the sides of the shoe progressively.

23. A machine of the class described having, in combination, toe and heel end lasting mechanisms, opposite side lasting mechanisms, and means for operating said side lasting mechanisms and for advancing them lengthwise of the shoe between successive operations to complete the lasting of the shoe between the portions operated upon by the end lasting mechanisms.

24. A machine of the class described having, in combination, toe and heel end lasting mechanisms for lasting each end of the shoe at one operation, and side lasting mechanisms movable lengthwise of the shoe to last different portions of the sides of the shoe successively and automatically operative to complete the lasting of the shoe between the portions operated upon by said end lasting mechanisms.

25. A machine of the class described having, in combination, toe and heel end lasting mechanisms, and opposite side lasting mechanisms arranged to operate in the shank portion of the shoe adjacent to the heel end lasting mechanism and thereafter to advance toward the toe of the shoe and to operate adjacent to the toe lasting mechanism.

26. A machine of the class described having, in combination, opposite sets of wipers for lasting respectively the toe and heel ends of a shoe, and opposite side lasting mechanisms movable progressively lengthwise of the shoe to last different portions of the sides of the shoe in succession substantially from the field of action of one set of wipers to that of the other set.

27. A machine of the class described having, in combination, toe and heel lasting mechanisms arranged to be positioned different distances apart for different lengths of shoes, and side lasting means movable progressively lengthwise of the shoe to last different portions of the sides of the shoe in succession and having its movement lengthwise of the shoe automatically limited in accordance with the relative positions of the end lasting mechanisms.

28. A machine of the class described having, in combination, an end lasting mechanism and side lasting mechanism relatively adjustable at different distances from each other for different lengths of shoes, and means for operating said side lasting mechanism to last different portions of the shoe successively and for advancing it lengthwise of the shoe a distance automatically limited in accordance with the relative adjustment of said mechanisms.

29. A machine of the class described having, in combination, an end lasting mechanism and side lasting mechanism arranged to be positioned in the same relation to each other for different lengths of shoes, and automatic means for operating said side lasting mechanism to last different portions of the sides of the shoe successively and for advancing it lengthwise of the shoe, a distance determined by the length of the shoe.

30. A machine of the class described having, in combination, toe and heel end lasting mechanisms relatively adjustable to vary the distance between them for different lengths of shoes, and side lasting means movable lengthwise of the shoe to last different portions of the shoe successively and arranged to last the sides of the shoe substantially from the field of action of one of said end lasting mechanisms to that of the other of said mechanisms irrespective of the length of the shoe.

31. A machine of the class described having, in combination, toe and heel end lasting mechanisms relatively adjustable to vary the distance between them for different lengths of shoes, opposite side lasting mechanisms, and means for operating said side lasting mechanisms to last the sides of the shoe in one location and for then moving them lengthwise of the shoe a distance determined by the relative adjustment of the end lasting mechanisms and for operating them to last the remaining portions of the sides of the shoe.

32. A machine of the class described having, in combination, toe and heel end lasting mechanisms relatively adjustable to vary the distance between them for different lengths of shoes, opposite side lasting mechanisms arranged to operate in different locations lengthwise of the shoe successively, and automatic means for advancing said side lasting mechanisms lengthwise of the shoe between successive lasting operations a distance determined by the relative adjustment of the end lasting mechanisms.

33. A machine of the class described having, in combination, toe and heel end lasting mechanisms relatively adjustable to vary the distance between them for different lengths of shoes, opposite side lasting mechanisms, means for moving said side lasting mechanisms repeatedly inward over the shoe, and spring means arranged to be tripped between successive operations of the side lasting mechanisms to advance said mechanisms lengthwise of the shoe a distance determined by the relative adjustment of the end lasting mechanisms.

34. A machine of the class described having, in combination, toe and heel end lasting mechanisms, means for adjusting the toe lasting mechanism toward or from the heel lasting mechanism, opposite side lasting mechanisms arranged to operate first in the shank of the shoe adjacent to the heel lasting mechanism, and means acting automatically to move the side lasting mechanisms forwardly to a position determined by the adjustment of the toe lasting mechanism preparatory to a second lasting operation on the sides of the shoe.

35. A machine of the class described having, in combination, toe and heel end lasting mechanisms, means for adjusting the toe lasting mechanism toward or from the heel lasting mechanism, opposite side lasting mechanisms arranged to operate first in the shank of the shoe, and spring means arranged to be tripped in time relation to the operation of the toe lasting mechanism to advance the side lasting mechanisms to a position determined by the adjustment of the toe lasting mechanism preparatory to a second lasting operation on the sides of the shoe.

36. A machine of the class described having, in combination, mechanism for lasting an end of a shoe, means for moving the shoe heightwise to cause said mechanism to work the upper toward the edge of the last bottom, side lasting mechanism arranged to operate on a portion of the length of the shoe to work the upper heightwise of the last as the shoe is thus moved, and means to cause the side lasting mechanism to operate thereafter on a different portion of the length of the shoe.

37. A machine of the class described having, in combination, mechanism for lasting the toe of a shoe, means for moving the shoe heightwise to cause said mechanism to work the upper toward the edge of the last bottom, side lasting mechanism arranged to operate on the shank portion of the shoe to upwipe the upper as the shoe is thus moved, and means for moving the side lasting mechanism thereafter toward the toe lasting mechanism and for operating it on a different portion of the shoe.

38. A machine of the class described having, in combination, mechanism for lasting the toe of a shoe, means for moving the shoe relatively to said toe lasting mechanism to upwipe the upper about the toe, side lasting mechanism arranged to upwipe the upper on a portion of the length of the shoe in response to such movement of the shoe, and means for operating said side lasting mechanism to lay the margin of the upper inwardly over the insole at that portion of the shoe where the upwiping takes place and for thereafter advancing said mechanism and operating it on a different portion of the length of the shoe.

39. A machine of the class described having, in combination, means for lasting the toe and heel ends of a shoe, and opposite side lasting mechanisms arranged to operate on the shank portion of the shoe to wipe the upper heightwise of the last and to lay its margin inwardly over the insole and thereafter to advance and operate on portions of the sides of the shoe in front of the shank.

40. A machine of the class described having, in combination, means for lasting an end of a shoe, and opposite side lasting mechanisms arranged to advance along the shoe and to operate successively in different locations lengthwise of the shoe to wipe the upper heightwise of the last and to lay its margin inwardly over the insole.

41. In a machine of the class described, the combination with means for lasting the toe end of a shoe, of means for moving the shoe heightwise to relax the pressure of said toe lasting means on the shoe, opposite side lasting mechanisms arranged to wipe the upper heightwise of the last at the rear of the toe in response to such movement of the shoe, and means for operating said side lasting mechanisms to lay the margin of the upper inwardly over the insole.

42. In a machine of the class described, the combination with toe lasting mechanism, of means for moving the shoe heightwise relatively to said toe lasting mechanism to wipe the upper about the toe toward the edge of the insole and for imparting to the shoe after the toe lasting operation a heightwise movement to relax the pressure of the toe lasting mechanism on the shoe, and opposite side lasting mechanisms arranged to operate in response to said different heightwise movements of the shoe to wipe the upper toward the edge of the insole in different locations lengthwise of the shoe.

43. A machine of the class described having, in combination, means for lasting the heel end of a shoe, and side lasting means constructed and arranged to complete the lasting of the opposite sides of the shoe adjacent to its heel end portion, including the fastening of the upper to the insole, prior to the lasting of the heel end of the shoe.

44. A machine of the class described having, in combination, means for lasting the heel end of a shoe, and opposite side lasting mechanisms arranged to operate adjacent to the front ends of the counter portion of the shoe to wipe the upper heightwise of the last and to lay the margin of the upper inwardly over the insole and fasten it to the insole prior to the lasting of the heel end of the shoe.

45. A machine of the class described having, in combination, means for lasting the heel end of a shoe, opposite side lasting mechanisms, and means for operating said side lasting mechanisms to lay the margin of the upper in the shank portion of the shoe inwardly over the insole and press it into adhering relation to the insole and then to withdraw from the shoe prior to the operation of the heel lasting means to lay the margin of the upper inwardly over the heel end of the insole.

46. A machine of the class described having, in combination, toe and heel end lasting mechanisms, opposite side lasting mechanisms, and means for operating said side lasting mechanisms to last the sides of the shoe in the shank prior to the lasting of the heel end of the shoe and to last the sides of the shoe adjacent to the toe end after the lasting of the toe end of the shoe.

47. A machine of the class described having, in combination, toe and heel end lasting mechanisms, opposite side lasting mechanisms arranged to operate first in the shank portion of the shoe, and means for advancing said side lasting mechanisms lengthwise of the shoe and for operating them to complete the lasting of the shoe between the shank and its toe end portion after the lasting of the toe end of the shoe.

48. A machine of the class described, having, in combination, toe lasting mechanism, heel last mechanism, means for moving a shoe and the heel lasting mechanism together heightwise of the shoe relatively to the toe lasting mechanism to work the upper about the toe toward the edge of the last bottom, and side lasting means arranged to work the upper heightwise of the last as the shoe is thus moved.

49. A machine of the class described having, in combination, toe lasting mechanism, heel lasting mechanism, means for moving a shoe and the heel lasting mechanism together heightwise of the shoe relatively to the toe lasting mechanism to work the upper about the toe toward the edge of the last bottom, side lasting mechanism arranged to work the upper heightwise of the last as the shoe is thus moved, and means for operating the toe, heel and side lasting mechanisms after such movement of the shoe has been substantially completed to lay the margin of the upper inwardly over the insole.

50. A machine of the class described having, in combination, toe lasting mechanism, heel lasting mechanism, means for moving the shoe and the heel lasting mechanism together heightwise of the shoe relatively to the toe lasting mechanism to work the upper about the toe toward the edge of the last bottom, side lasting mechanisms arranged to work the upper heightwise of the last in the shank in response to such movement of the shoe, means for operating the toe and heel lasting mechanisms after said movement of the shoe has been completed to lay the margin of the upper over the insole, and means for operating the side lasting mechanisms to lay the upper inwardly over the insole in the shank and for thereafter advancing the side lasting mechanisms and operating them to complete the lasting of the shoe between the shank and the toe lasting mechanism.

51. In a machine of the class described, the combination with shoe positioning means, of side lasting mechanism, power-operating means for effecting relative movement of the shoe and said mechanism heightwise of the shoe to wipe the upper toward the edge of the insole, means for bringing the machine to a stop at the completion of said relative movement and before the margin of the upper is laid inwardly over the insole, and means for operating the side lasting mechanism when the machine is again started to lay the margin of the upper inwardly.

52. In a machine of the class described, the combination with shoe positioning means, of toe lasting mechanism, opposite side lasting mechanisms arranged to operate first in the shank of the shoe, power-operated means for effecting relative movement of the shoe and said toe and side lasting mechanisms heightwise of the shoe to work the upper toward the edge of the insole about the toe and in the shank, means for bringing the machine to a stop at the completion of said relative movement and before the margin of the upper is laid inwardly over the insole, and means for operating said toe and side lasting mechanisms when the machine is again started to lay the margin of the upper over the insole and for thereafter moving the side lasting mechanisms forwardly and operating them again to last the shoe in the vicinity of the ball of the last.

53. In a machine of the class described, the combination with shoe positioning means, of side lasting mechanism, means for effecting relative movement of the shoe and said mechanism heightwise of the shoe to work the upper toward the edge of the insole, and means for operating said mechanism to lay the upper inwardly over the insole in one location lengthwise of the shoe and thereafter to lay the upper over the insole at a different portion of the length of the shoe.

54. In a machine of the class described, the combination with shoe positioning means, of opposite side lasting mechanisms, means for effecting relative movement of the shoe and said mechanisms heightwise of the shoe to work the upper toward the edge of the insole in the shank portion of the shoe, and means for operating said mechanisms to lay the upper over the insole in the shank and for thereafter effecting relative positioning movement of the shoe and said mechanisms lengthwise of the shoe and for operating said mechanisms to lay the upper over the insole in the vicinity of the ball of the shoe.

55. In a machine of the class described, the combination with a support for a last with a shoe thereon, of opposite side lasting mechanisms constructed to last substantially the entire shank portion of the shoe at one operation, and means for effecting relative positioning movement of the support and said mechanisms after the shank lasting operation and for then operating said mechanisms to last the shoe in the vicinity of the ball while the shoe remains on said support.

56. In a machine of the class described, the combination with a shoe support, of opposite side lasting mechanisms, and means for moving said mechanisms lengthwise of the shoe between different lasting operations and for operating said mechanisms to lay the margin of the upper inwardly and press it into adhering relation to the insole in different locations lengthwise of the shoe successively.

57. In a machine of the class described, the combination with a shoe support, of opposite side lasting mechanisms, and means for operating said mechanisms to lay the margin of the upper over the insole and press it into adhering relation to the insole in the shank portion of the shoe and for thereafter moving said mechanisms lengthwise of the shoe and operating them adjacent to the toe end of the shoe to lay the upper inwardly and press it into adhering relation to the insole.

58. In a machine of the class described, the combination with shoe positioning means, of opposite side lasting mechanisms arranged to move lengthwise of the shoe between different lasting operations, and operating means for effecting relative movements of the shoe and said mechanisms to wipe the upper heightwise of the shoe and to lay its margin inwardly over the insole in different locations lengthwise of the shoe successively.

59. In a machine of the class described, the combination with a shoe support, of opposite side lasting mechanisms arranged to operate successively in different locations lengthwise of the shoe, and spring means arranged to be tripped to advance said mechanisms from one location to another.

60. In a machine of the class described, the combination with a shoe support, of opposite side lasting mechanisms, means for moving the shoe heightwise relatively to said mechanisms, and independently operative means for moving said lasting mechanisms inwardly toward the sides of the shoe in time relation to said heightwise movement of the shoe to render said mechanisms effective to work the upper toward the edge of the last bottom as the shoe is thus moved.

61. In a machine of the class described the combination with a shoe support, of opposite side lasting mechanisms, spring means for moving said mechanisms inwardly toward the sides of the shoe, and cam means arranged to act on said mechanisms independently of the spring means for controlling the inward movement of the mechanisms.

62. In a machine of the class described, the combination with a shoe support, of opposite side lasting mechanisms, spring means for moving said mechanisms inwardly toward the sides of the shoe, and means comprising a toggle connected to said opposite side lasting mechanisms for controlling their inward movement.

63. In a machine of the class described, the combination with a shoe support, of opposite side lasting mechanisms, spring means for moving said mechanisms inwardly toward the sides of the shoe, and power-operated means for controlling the inward movement of said lasting mechanisms comprising spring means for applying additional force to said mechanisms to increase their pressure on the shoe.

64. In a machine of the class described, the combination with shoe supporting means, of opposite side lasting mechanisms comprising supports movable toward and from the sides of the shoe, members movable toward and from the shoe relatively to said supports, flexible lasting straps connected at their opposite ends respectively to said supports and members, spring means for moving said supports toward the shoe, and means for controlling such movement of the supports through said movable members.

65. In a machine of the class described, the combination with shoe supporting means, of opposite side lasting mechanisms comprising supports movable toward and from the sides of the shoe, members movable toward and from the shoe relatively to said supports, flexible lasting straps connected at their opposite ends respectively to said supports and members, springs for holding said members in fixed relation to said supports during a portion of the movement of the supports toward the shoe, and means connected to said members for controlling the movement of the supports toward the shoe and for imparting to said members movement toward the shoe relatively to said supports.

66. In a machine of the class described, the combination with shoe supporting means, of opposite side lasting mechanisms comprising supports movable toward and from the sides of the shoe, arms also movable toward and from the sides of the shoe, flexible lasting straps connected at their opposite ends respectively to said supports and arms, springs for holding said arms outwardly against said supports, spring means for moving said supports inwardly toward the shoe, and cam controlled toggle mechanism connected to said arms for controlling the inward movement of the supports and for imparting inward movement to the arms relatively to the supports.

67. In a machine of the class described, the combination with a shoe support, of side lasting mechanism comprising a plurality of flexible lasting straps arranged to engage the side of the shoe respectively at different portions of its length and also to lay the margin of the upper inwardly over the insole, and a support common to said lasting straps for moving them together bodily toward the side of the shoe, each of said straps being yieldable independently of the others in response to the resistance of the shoe.

68. In a machine of the class described, the combination with a shoe support, of side lasting mechanism comprising a plurality of flexible lasting straps arranged in a series lengthwise of the shoe and each having one of its ends so disposed as to lay the margin of the upper inwardly over the insole, a support common to said straps and movable to carry them bodily toward the shoe, and controlling means connected to the overlaying ends of said straps and permitting the different straps to yield independently of each other in response to resistance of the shoe.

69. In a machine of the class described, the combination with shoe positioning means, of side lasting mechanism comprising a plurality of flexible lasting straps arranged in a series lengthwise of the shoe and each having one of its ends so disposed as to lay the margin of the upper inwardly over the insole, a support to which said straps are connected at their other ends, said support being movable to carry the straps toward the side of the shoe, and members yieldably controlling the overlaying ends of said straps to permit them to conform to the contour of the shoe.

70. In a machine of the class described, the combination with shoe positioning means, of side lasting mechanism comprising a plurality of flexible lasting straps arranged in a series lengthwise of the shoe, a support to which said straps are connected at one end, said support being movable to carry the straps toward the side of the shoe, a member movable with and relatively to said support laterally of the shoe, and independently yieldable connections between said member and the other ends of the respective straps.

71. In a machine of the class described, the combination with shoe positioning means, of side lasting mechanism comprising a plurality of flexible lasting straps arranged in a series lengthwise of the shoe, a support to which said straps are connected at one end, said support being movable to carry the straps toward the side of the shoe, an arm movable relatively to said support laterally of the shoe, and connections between said arm and the other ends of the straps comprising members mounted to move independently of one another heightwise of the shoe to lay the margin of the upper upon the insole.

72. In a machine of the class described, the combination with shoe positioning means, of side lasting mechanism comprising a plurality of flexible lasting straps arranged in a series lengthwise of the shoe, means for supporting said straps at one end, an arm movable laterally of the shoe, and connections between said arm and the other ends of the straps comprising members mounted to move independently of one another heightwise of the shoe in response to the pull of the straps to lay the margin of the upper upon the insole, said connections including springs associated respectively with said different members for transmitting the force of said arm yieldingly to the members.

73. In a machine of the class described, the combination with shoe positioning means, of side lasting mechanism comprising a plurality of flexible lasting straps arranged in a series lengthwise of the shoe, means for supporting said straps at one end, an arm movable laterally of the shoe, connections between said arm and the other ends of the straps comprising members mounted to move independently of one another heightwise of the shoe to lay the margin of the upper upon the insole, and means for controlling said members to maintain the straps substantially taut prior to their engagement with the shoe.

74. In a machine of the class described, the combination with shoe positioning means, of side lasting mechanism comprising a plurality of flexible lasting straps arranged in a series lengthwise of the shoe, means for effecting relative movement of the shoe and said straps heightwise of the shoe to wipe the upper toward the edge of the last bottom, and members associated with the different respective straps and engaging said straps in locations opposite to the side of the shoe for pressing the straps yieldingly against the side of the shoe in the upwiping operation.

75. In a machine of the class described, the combination with shoe positioning means, of side lasting mechanism comprising a plurality of flexible lasting straps arranged in a series lengthwise of the shoe, means for effecting relative movement of the shoe and said straps heightwise of the shoe to work the upper toward the edge of the last bottom, members associated with the different respective straps for pressing them against the side of the shoe, said members being yieldable independently of one another laterally of the shoe, and additional members connected to the straps for laying the margin of the upper inwardly over the insole.

76. In a machine of the class described, the combination with shoe positioning means, of side lasting mechanism comprising a plurality of flexible lasting straps arranged in a series lengthwise of the shoe, a support movable laterally of the shoe to which said straps are connected at one end, means movable laterally of the shoe relatively to said support and connected to the other ends of the straps for laying the upper inwardly over the insole, and members carried by said support for pressing the intermediate portions of the different respective straps against the side of the shoe, said members being yieldable independently of one another in response to resistance of the shoe.

77. In a machine of the class described, the combination with shoe positioning means, of side lasting mechanism comprising a plurality of flexible lasting straps arranged in a series lengthwise of the shoe, and pressure applying members arranged to engage said straps in locations opposite to the side of the shoe to press the straps against the shoe, said members being yieldable laterally of the shoe independently of one another.

78. In a machine of the class described, the combination with shoe positioning means, of lasting mechanism comprising a flexible lasting member extending heightwise of the shoe, and a yieldingly operated device connected to said flexible member and movable inwardly to lay the margin of the upper over the insole, said device being movable toward the plane of the shoe bottom in response to the pull of said flexible member to press the upper upon the insole.

79. In a machine of the class described, the combination with shoe positioning means, of lasting mechanism comprising a flexible lasting strap extending heightwise of the shoe, an overlaying member and yieldable means for moving it inwardly over the bottom of the shoe to lay the margin of the upper over the insole, and a connection betwen said strap and overlaying member to cause the strap to pull said member toward the plane of the shoe bottom in response to the inwardly directed force applied to said member.

80. In a machine of the class described, the combination with shoe positioning means, of lasting mechanism comprising a flexible lasting strap extending heightwise of the shoe, an overlaying member, an arm yieldingly connected to said overlaying member to force said member inwardly over the bottom of the shoe, said member being mounted to tip relatively to the arm heightwise of the shoe, and a connection between said lasting strap and overlaying member to cause said member to be pulled toward the plane of the shoe bottom by the resistance of the strap to the force applied by said arm.

81. In a machine of the class described, the combination with shoe positioning means, of side lasting mechanism comprising a flexible lasting strap extending heightwise of the shoe, a pressure applying member arranged to engage said strap in a location opposite to the side of the shoe to press the strap against the shoe, and means arranged to act through one end of said strap to lay the margin of the upper inwardly over the insole and to press it into adhering relation to the insole.

82. In a machine of the class described, the combination with shoe positioning means, of side lasting mechanism comprising a flexible lasting strap extending heightwise of the shoe, a member yieldingly mounted for pressing said strap against the side of the shoe, and an overlaying member connected to said strap and arranged to be forced toward the plane of the shoe bottom in response to resistance of the strap to movement of said overlaying member inwardly over the bottom of the shoe.

83. In a machine of the class described, the combination with shoe positioning means, of side lasting mechanism comprising a flexible lasting member extending heightwise of the shoe, a support movable to carry said member toward the side of the shoe, a member carried by said support for pressing said flexible member yieldingly against the side of the shoe, and an overlaying member connected to said flexible member and movable relatively to said support to force the flexible member inwardly over the bottom of the shoe, said overlaying member being movable toward the plane of the shoe bottom in response to the pull of the flexible member.

84. In a machine of the class described, the combination with shoe positioning means, of side lasting mechanism comprising a flexible lasting strap extending heightwise of the shoe, a support movable to carry said strap toward the side of the shoe and to which the strap is fastened at one end, an overlaying member movable with and relatively to said support and connected to the other end of the strap, means for forcing said overlaying member inwardly over the bottom of the shoe, and a member carried by said support for pressing the intermediate portion of the strap against the side of the shoe, said member being yieldable relatively to the support in response to resistance of the shoe.

85. In a machine of the class described, the combination with shoe positioning means, of lasting mechanism comprising a flexible lasting strap extending heightwise of the shoe, means acting through said strap to lay the margin of the upper inwardly over the insole and to press it into adhering relation to the insole, and a spring controlled pad of yieldable material for engaging said strap and pressing it against the side of the shoe.

86. In a machine of the class described, the combination with shoe positioning means, of lasting mechanism comprising a flexible lasting strap extending heightwise of the shoe, means for effecting relative movement of the shoe and said strap heightwise of the shoe to wipe the upper toward the edge of the shoe bottom, an overlaying member connected to one end of said strap and movable inwardly to lay the margin of the upper over the insole, said member being mounted to tip toward the plane of the shoe bottom to press the margin of the upper upon the insole, and means arranged to act on the overlaying member prior to its inward movement to prevent it from tipping toward said plane and thereby cause it to hold said strap substantially taut.

87. In a machine of the class described, the combination with shoe positioning means, of side lasting mechanism comprising a support movable laterally of the shoe, an arm also movable laterally of the shoe, a lasting strap extending heightwise of the shoe and connected at one end to said support and at the other end to said arm, and means for moving said support and arm together toward the side of the shoe and for thereafter moving the arm relatively to the support to force the strap inwardly over the bottom of the shoe.

88. In a machine of the class described, the combination with shoe positioning means, of side lasting mechanism comprising a support movable laterally of the shoe, an arm also movable laterally of the shoe, a lasting strap extending heightwise of the shoe and connected at one end to said support and at the other end to said arm, and means for moving said support and arm together toward the side of the shoe and for thereafter moving the arm relatively to the support to force the strap inwardly over the bottom of the shoe, the connection between the strap and said arm comprising a member arranged to be pulled toward the bottom of the shoe by the resistance of the strap to the movement of the arm.

89. In a machine of the class described, the combination with shoe positioning means, of side lasting mechanism comprising a support movable laterally of the shoe, an arm also movable laterally of the shoe, a lasting strap connected at one end to said support, an overlaying member connecting the other end of the strap to said arm, means for moving said support and arm together toward the side of the shoe and for thereafter moving the arm relatively to the support to force the overlaying member inwardly over the bottom of the shoe, said overlaying member being mounted to tip toward the bottom of the shoe in response to the pull of the strap, and a device on said support arranged to hold said overlaying member initially from such tipping movement and subsequently to permit it to tip as the arm is moved inward relatively to the support.

90. In a machine of the class described, the combination with shoe positioning means, of side lasting mechanism arranged to operate successively in different locations lengthwise of the shoe, said side lasting mechanism comprising a plurality of lasting devices arranged in a series lengthwise of the shoe and each automatically conformable to the contour of that portion of the shoe upon which it operates.

91. In a machine of the class described, the combination with shoe positioning means, of side lasting mechanism arranged to operate repeatedly upon the shoe, and means for effecting relative movement of said mechanism and the shoe in the direction of the length of the shoe between successive operations of said mechanism, said side lasting mechanism comprising a plurality of flexible lasting members arranged in a series lengthwise of the shoe and each automatically conformable to the contour of that portion of the shoe upon which it operates.

92. In a machine of the class described, the combination with shoe positioning means, of side lasting mechanism and means for operating it successively on different portions of the length of the shoe, said side lasting mechanism comprising a plurality of flexible lasting straps and devices for controlling said straps to conform each strap to the contour of that portion of the shoe upon which it operates.

93. In a machine of the class described, the combination with lasting means, of means for clamping an insole on the bottom of the last before the operation of said lasting means, and a gage member movable into and out of position to gage the height of the last prior to the operation of said clamping means.

94. In a machine of the class described, the combination with power-operated lasting means, of means for clamping an insole on the bottom of the last before the operation of said lasting means, a member movable into position over the bottom of the last to gage the height of the last, and means for moving said member into and out of operative position prior to the starting of the machine.

95. In a machine of the class described, the combination with power-operated lasting means, of a member movable manually into position to clamp an insole on the bottom of the last prior to the starting of the machine, and a manually controlled member movable into position to gage the height of the last and then out of said position prior to the movement of said clamping member to operative position.

96. In a machine of the class described, the combination with power-driven means for operating on shoe materials on a last, of a gage member movable into and out of operative position, and means for preventing the starting of the machine while said gage member is in operative position.

97. In a machine of the class described, the combination with power-driven means for operating on shoe materials on a last, and a starting treadle, of a gage member, operating means for moving said gage member to operative position, and mechanism controlled by said operating means for the gage member for locking the starting treadle against movement to start the machine.

98. In a machine of the class described, the combination with power-driven means for operating on shoe materials on a last, and a treadle for starting the machine, of a gage member, a treadle for moving said gage member to operative position, spring means for returning the gage treadle and the gage member to idle position when the gage treadle is released, and a device controlled by said gage treadle for preventing movement of the starting treadle to start the machine while the gage member is in operative position.

99. In a machine of the class described, the combination with a support for a last and its shoe materials, of a member movable into position to apply pressure to shoe material on the bottom of the last, a gage member movable to operative position over the bottom of the last, and means for preventing movement of said pressure applying member to operative position while the gage member is in operative position.

100. In a machine of the class described, the combination with a support for a last and its shoe materials, of a member movable into position to apply pressure to shoe material on the bottom of the last, a treadle for moving said member to operative position, a gage member and a treadle for moving it into operative position over the bottom of the last, and means controlled by said last-named treadle for preventing operative movement of the first-named treadle while the gage member is in operative position.

101. In a machine of the class described, the combination with a work support, of a member for operating on the work mounted for movement into engagement with the work, power operating means, means for starting the machine having connections for moving said member to operative position before the machine is started, and means for gaging the position of the work before said member is moved to operative position to insure a proper correlation between the movement of said member and the starting of the machine.

102. In a machine of the class described, the combination with a support for a last and its shoe materials, of a member movable from an idle position into engagement with shoe material on the bottom of the last, power-driven means for imparting further movement to said member to move the last in the direction of its height, manual means for moving said member to shoe engaging position, said manual means being operative by further movement to start the operation of said power means, and gaging means for determining the plane in which the bottom of the shoe is presented to insure a proper correlation between the positioning movement of said member and the starting of said power means.

103. In a machine of the class described, the combination with a support for a last and its shoe materials, of a member movable into position to clamp an insole on the bottom of the last, power-driven means for further moving said member to depress the last, manual means for moving said member to clamping position, said manual means being operative by further movement to start the operation of said power means, and means for gaging the height of the last to insure a proper correlation between the clamping of the insole and the starting of said power means.

104. In a machine of the class described, the combination with lasting means and a support for the last and its shoe materials, of a last depressor movable manually into operative relation to the last and then operative by power to depress the last relatively to the lasting means, a starting treadle connected to said depressor to move it into operative position prior to the starting of the machine, and means for initially gaging the position of the last relatively to the positioning movement of the last depressor.

105. In a machine of the class described, the combination with lasting means and a support for the last and its shoe materials, of a last depressor movable into engagement with an insole on the last and operative by further movement to depress the last relatively to the lasting means, connections for imparting such movement to the last depressor, power means for operating said connections, a member for starting said power means arranged to operate through said connections to move the depressor into engagement with the insole before said power means is started, and means for initially gaging the height of the last to insure a proper correlation between the movement of the depressor into insole engaging position and the beginning of the operation of the depressor by power.

106. In a machine of the class described the combination with a support for a last and its shoe materials, and means for operating on said materials, of a last depressor, manual means for moving said last depressor into operative relation to the last, and power operating mechanism controlled by said manual means for initiating the operation of said depressor by power at a predetermined point in the movement of the depressor.

107. In a machine of the class described, the combination with a support for a last and its shoe materials, and means for operating on said materials, of a last depressor, power means for operating said depressor, and a member movable manually to position said depressor relatively to the last and operative by further movement in the same direction to start said power means in operation.

108. In a machine of the class described, the combination with lasting means and a support for the last and its shoe materials, of a last depressor, power means for operating said depressor to depress the last relatively to the lasting means, a treadle for starting said power means in operation, and connections operated by said treadle for positioning said depressor relatively to the last prior to the starting of the power means.

109. In a machine of the class described, the combination with lasting means and a support for the last and its shoe materials, of a member for engaging an insole on the last and for depressing the last relatively to the lasting means, power means for imparting last depressing movement to said member, and a single means for moving said member into engagement with the insole and for starting said power means in operation.

110. In a machine of the class described, the combination with lasting means and a support for the last and its shoe materials, of a member for clamping a loose insole on the last, power means for operating said member to move the last heightwise relatively to the lasting means, manual means for moving said member to clamping position, and a clutch arranged to be actuated by further movement of said manual means to initiate the power operation of said member.

111. In a machine of the class described, the combination with lasting means and a support for the last and its shoe materials, of means for clamping a loose insole on the last, power operating means, and a single manually operated means for moving said clamping means to clamping position and for thereafter starting said power means in operation.

112. In a machine of the class described, the combination with lasting means and a support for the last and its shoe materials, of means for clamping a loose insole on the last, a treadle for moving said clamping means to clamping position, and a clutch arranged to be actuated by further movement of said treadle to initiate the operation of the machine by power.

113. In a machine of the class described, the combination with lasting means and a support for the last and its shoe materials, of depressors for the opposite end portions of the last, mechanism connecting said depressors for movement in unison, a treadle for operating said mechanism to move the depressors to operative position, and power means arranged to be connected to said mechanism by further movement of the treadle for operating said depressors by power to depress the last.

114. In a machine of the class described, the combination with lasting means and a support for the last and its shoe materials, of members for clamping the opposite end portions of a loose insole on the last, manual means for moving said members to clamping position, and power means arranged to be started in operation by further movement of said manual means to operate said members by power to move the last heightwise relatively to the lasting means.

115. In a machine of the class described, the combination with lasting means and a support for the last and its shoe materials, of members for clamping the opposite end portions of a loose insole on the last, rack and pinion mechanism connecting said members for movement in unison, a treadle for operating said rack and pinion mechanism to move said members to clamping position, a power-driven element, and a clutch arranged to be actuated by further movement of said treadle to connect said power-driven element to the rack and pinion mechanism for operating said members to depress the last.

116. In a machine of the class described, the combination with a last support and power-operated lasting means, of a heel band mounted to swing lengthwise of the last into position to clamp a loose upper about the heel end of the last, and manual means enabling the operator to cause the clamping of the upper by said heel band while he holds the upper in proper relation to the last prior to the power operation of the machine.

117. In a machine of the class described, the combination with a last support and lasting means, of a spring-operated device for clamping a loose upper on the last while the last is substantially stationary on said support, and means for tripping said clamping device to render it operative.

118. In a machine of the class described, the combination with a last support and lasting means, of a heel band movable lengthwise of the last, spring means for moving said heel band to operative position, and a device for tripping said spring means to render it operative.

119. In a machine of the class described, the combination with a last support and power-operated lasting means, of a spring-operated heel band, means for tripping said band to cause it to be applied about the heel end of the last prior to the power operation of the machine, and automatic means for returning said heel band to starting position.

120. In a machine of the class described, the combination with a last support and toe lasting means, of a device for clamping an upper upon the heel end of the last, and means for moving the last and said clamping device together heightwise of the last relatively to the toe lasting means to shape the upper about the toe.

121. In a machine of the class described, the combination with toe lasting means, of a last support, a heel band carried by said support, and means for moving the last with its support and heel band relatively to the toe lasting means in the direction of the height of the last to render said lasting means effective on the upper.

122. In a machine of the class described, the combination with toe lasting means, of a last support, a spring-operated heel band carried by said support and arranged to be tripped by the operator to clamp a loose upper about the heel end of the last, and power-operated means for thereafter depressing the last with its support and heel band relatively to the toe lasting means.

123. In a machine of the class described, the combination with a shoe support, of a heel band, a spring-operated support for said heel band arranged to be tripped to apply the band to the shoe, and heel wipers carried by said heel band support to be positioned relatively to the shoe when the heel band is applied to the shoe.

124. In a machine of the class described, the combination with a shoe support and toe lasting means, of a heel band and heel wipers movable as a unit to apply the band to the shoe and to position the wipers relatively to the shoe, and means for depressing the shoe together with the heel band and wipers relatively to the toe lasting means to shape the upper about the toe.

125. In a machine of the class described, the combination with a shoe support and toe lasting means, of a heel band and heel wipers carried by said shoe support, and means for moving the shoe with its support and heel band and wipers in the direction of the height of the shoe relatively to said lasting means to shape the upper about the toe.

126. In a machine of the class described, the combination with toe lasting means and a yieldingly sustained shoe support, of heel end lasting means carried by said shoe support, and a depressor movably mounted independently of said shoe support for depressing the shoe and its heel end lasting means relatively to the toe lasting means.

127. In a machine of the class described, the combination with toe lasting means, of a shoe support and heel end lasting means movable as a unit heightwise of the shoe relatively to the toe lasting means to render said toe lasting means effective on the shoe.

128. In a machine of the class described, the combination with a shoe support, of end-lasting wipers, yieldable means against the resistance of which said wipers are movable heightwise of the shoe toward the plane of the shoe bottom, and means mounted independently of the wipers for movement into engagement with them to position them relatively to said plane against the resistance of said yieldable means.

129. In a machine of the class described, the combination with a shoe support, of end-lasting wipers, spring means for positioning said wipers initially heightwise of the shoe at a distance from the plane of the shoe bottom, and means for moving the wipers against the resistance of said spring means to position them relatively to said plane prior to their operation on the shoe.

130. In a machine of the class described, the combination with a shoe support, of end-lasting wipers, a wiper support, means on said wiper support for upholding the wipers yieldingly, and means for depressing the wipers against the resistance of said yieldable means to position them in predetermined relation to the plane of the shoe bottom.

131. In a machine of the class described, the combination with a shoe support, of end-lasting wipers, yieldable means against the resistance of which said wipers are movable toward the plane of the shoe bottom to position them, means for imparting such positioning movement to the wipers, and a device for engaging the bottom of the shoe to determine the limit of said movement.

132. In a machine of the class described, the combination with a shoe support, of end-lasting wipers, spring means against the resistance of which said wipers are movable heightwise of the shoe toward the plane of the shoe bottom, and wiper positioning means mounted independently of the wipers for movement toward the plane of the shoe bottom to position the wipers against the resistance of said spring means, said positioning means having a member for engaging the bottom of the shoe to limit the positioning movement of the wipers.

133. In a machine of the class described, the combination with a shoe support, of end-lasting wipers, a wiper support, a plurality of spring-plungers on said wiper support for yieldingly upholding the wipers while permitting them to be depressed and tipped to position them bodily and angularly relatively to the plane of the shoe bottom, and means having bearing engagement with the wipers in different locations for positioning them against the resistance of said spring-plungers.

134. In a machine of the class described, the combination with a shoe support, of end-lasting wipers, a wiper support, spring means on said wiper support for positioning the wipers above the plane of the shoe bottom, and means for depressing the wipers against the resistance of said spring means and for positioning them in predetermined relation to said plane.

135. In a machine of the class described, the combination with a shoe support, of end-lasting wipers, spring means for upholding said wipers yieldingly, a shoe depressor, and means movable with said shoe depressor for depressing the wipers against the resistance of said spring means to position the wipers relatively to the plane of the shoe bottom prior to the depression of the shoe.

136. In a machine of the class described, the combination with a shoe support, of end-lasting wipers, a member for engaging the bottom of the shoe and for moving the shoe in the direction of its height, and means movable with said member to position the wipers relatively to the plane of the shoe bottom.

137. In a machine of the class described, the combination with a shoe support, of end-lasting wipers, a wiper support, spring means on said wiper support for upholding the wipers yieldingly, a member movable heightwise of the shoe into engagement with the insole and operative by further movement to depress the shoe and the wiper support, and means mounted in fixed relation to said member for depressing the wipers relatively to the wiper support to a position determined by engagement of said member with the insole.

138. In a machine of the class described, the combination with toe lasting means, and a shoe support movable in the direction of the height of the shoe relatively to said toe lasting means, of heel lasting wipers, yielding means against the resistance of which said wipers are movable heightwise of the shoe relatively to the shoe support, and means for thus moving the wipers to position them relatively to the plane of the shoe bottom and for thereafter moving the shoe with its support and heel wipers together relatively to the toe lasting means.

139. In a machine of the class described, the combination with toe lasting means, and a shoe support depressible relatively to said toe lasting means, of heel lasting wipers yieldingly sustained by said shoe support to permit them to be depressed relatively to the shoe, a member for engaging the insole and depressing the shoe with its support and heel wipers relatively to the toe lasting means, and means movable with said member to depress the wipers and position them in a relation to the shoe determined by the engagement of said member with the insole prior to the depression of the shoe.

140. In a machine of the class described, the combination with a shoe support, of a heel band and heel lasting wipers movable as a unit to apply the band to the shoe and to position the wipers lengthwise of the shoe, said wipers being yieldingly supported for movement heightwise of the shoe relatively to the heel band, and means for imparting such movement to the wipers and for determining by engagement with the shoe the relation of the wipers to the plane of the shoe bottom.

141. In a machine of the class described, the combination with a shoe support, of heel lasting wiper mechanism mounted for positioning movement lengthwise of the shoe and yieldingly upheld to permit it to be depressed heightwise of the shoe, and depressing means movable independently of the wiper mechanism from an idle position to a position substantially over the bottom of the shoe and operative by further movement to depress said wiper mechanism and position it in predetermined relation to the plane of the shoe bottom.

142. In a machine of the class described, the combination with a shoe support, of end-lasting wiper mechanism yieldingly controlled to permit it to be moved heightwise of the shoe and tipped to position it relatively to the plane of the shoe bottom, and means supported independently of said wiper mechanism and constructed to bear on said mechanism at a plurality of points for imparting thereto such positioning movement.

143. In a machine of the class described, the combination with a shoe support, of end-lasting wiper mechanism yieldingly controlled to permit it to be moved both bodily and angularly heightwise of the shoe to position it relatively to the plane of the shoe bottom, and means supported independently of said wiper mechanism for engaging and positioning said mechanism, said positioning means being angularly adjustable to determine the angular relation of the wiper mechanism to said plane.

144. In a machine of the class described, the combination with a shoe support, of a wiper carrier having end-embracing wipers mounted thereon, a spring-plunger having a slideway in which said wiper carrier is movable lengthwise of the shoe, additional spring-plungers to assist in controlling the wipers, and means for moving the wipers and their carrier against the resistance of said spring-plungers to position the wipers relatively to the plane of the shoe bottom.

145. In a machine of the class described, the combination with a shoe support, of a heel band, a support for said heel band having arms connected to the opposite ends of the band, a wiper carrier having heel lasting wipers thereon, a spring-plunger on said heel band support for sustaining said wiper carrier, additional spring-plungers on said heel band supporting arms to assist in sustaining the wipers, and means for moving said wipers and their carrier against the resistance of said spring-plungers to position the wipers relatively to the shoe.

146. In a machine of the class described, the combination with a shoe support, of end-lasting wipers mounted for positioning movement heightwise of the shoe, a device supported independently of the wipers for imparting to them such positioning movement, a member carried by said positioning device for engaging the bottom of the shoe to determine the limit of said movement, means for effecting relative movement of the shoe and said positioning device heightwise of the shoe to increase the pressure of the wipers on the shoe materials, and means for rendering said bottom-engaging member ineffective to prevent such relative movement.

147. In a machine of the class described, the combination with a shoe support, of end-lasting mechanism mounted for positioning movement heightwise of the shoe, a device movable heightwise of the shoe into engagement with said end-lasting mechanism and operative by further movement to position said mechanism relatively to the shoe, a member movable in fixed relation to said device into engagement with the bottom of the shoe to limit such positioning movement, means for effecting relative movement of the shoe and said positioning device heightwise of the shoe to increase the pressure of the end-lasting mechanism on the shoe, and means for rendering said bottom-engaging member ineffective to permit such relative movement.

148. In a machine of the class described, the combination with a shoe support, of end-lasting mechanism mounted for positioning movement heightwise of the shoe, a device supported independently of said end-lasting mechanism for movement heightwise of the shoe to impart positioning movement to said mechanism, a member for engaging the bottom of the shoe to limit such movement, means for effecting relative movement of the shoe and said positioning device heightwise of the shoe to increase the pressure of the end-lasting mechanism on the shoe, and means for rendering said bottom-engaging member ineffective to prevent such relative movement.

149. In a machine of the class described, the combination with a shoe support, of end-lasting mechanism, yielding means against the resistance of which said mechanism is movable heightwise of the shoe to position it relatively to the plane of the shoe bottom, means for imparting such positioning movement to the end-lasting mechanism and for thereafter holding said mechanism against reverse movement, a member for engaging the bottom of the shoe to determine the limit of said positioning movement, means for effecting subsequently relative movement of the shoe and said positioning and holding means heightwise of the shoe to increase the pressure of the end-lasting mechanism on the shoe, and means for rendering said member ineffective to prevent such relative movement.

150. In a machine of the class described, the combination with a shoe support, of end-lasting wipers, yielding means against the resistance of which said wipers are depressible to position them relatively to the plane of the shoe bottom, a device supported independently of the wipers for depressing them, a member associated with said device for engaging the bottom of the shoe to limit such depression, means for subsequently effecting relative movement of the shoe and said depressing device heightwise of the shoe to increase the pressure of the wipers on the shoe, and means for rendering said member ineffective to prevent such relative movement.

151. In a machine of the class described, the combination with a shoe support, of yieldingly sustained end-lasting wipers, a device for depressing said wipers to position them relatively to the plane of the shoe bottom, a member fixed relatively to said device for engaging the bottom of the shoe to determine the position of the wipers, means for subsequently effecting relative movement of the shoe and said depressing device heightwise of the shoe to increase the pressure of the wipers on the shoe, and means for interrupting the fixed relation between said device and the bottom-engaging member to permit such relative movement.

152. In a machine of the class described, the combination with a shoe support, of yieldingly sustained end-lasting wipers, mechanism movable into position substantially over the bottom of the shoe and downwardly to depress the wipers and having means for engaging the bottom of the shoe to determine the relation of the wipers to the plane of the shoe bottom, means for advancing and closing the wipers, and mechanism automatically operative in time relation to the advancing and closing of the wipers to render said determining means inoperative.

153. In a machine of the class described, the combination with a shoe support, of yieldingly sustained end-lasting wipers, a device for depressing said wipers, a member fixed relatively to said depressing device for engaging the bottom of the shoe to determine the relation of the wipers to the plane of the shoe bottom, means for advancing and closing the wipers, and mechanism automatically operative in time relation to the advancing and closing of the wipers to interrupt the fixed relation between said device and member.

154. In a machine of the class described, the combination with end-lasting mechanism, of a shoe support and a controlling device for said end-lasting mechanism relatively movable heightwise of the shoe for relatively positioning the shoe and said mechanism, a member for engaging the bottom of the shoe to limit such relative positioning movement, a togggle for holding said member in fixed relation to said controlling device, means for breaking said toggle, and means operative upon the breaking of the toggle to effect relative movement of the shoe and the end-lasting mechanism heightwise of the shoe to increase the pressure of said mechanism on the shoe.

155. In a machine of the class described, the combination with a yieldingly sustained shoe support, of end-lasting wipers, a shoe depressor having means in fixed relation thereto for positioning said wipers relatively to the plane of the shoe bottom as determined by engagement of said depressor with the shoe, and means for relieving the shoe of the pressure of said depressor without affecting the position of the wipers to permit the shoe to be forced against the wipers by the action of the shoe support.

156. In a machine of the class described, the combination with a yieldingly sustained shoe support, of end-lasting wipers yieldingly supported for movement heightwise of the shoe, a shoe depressor and a device in fixed relation thereto for depressing the wipers and positioning them in predetermined relation to the plane of the shoe bottom and for then depressing the shoe and the wipers, and means for thereafter interrupting the fixed relation between said shoe depressor and the wiper positioning device and for rendering said depressor retractible without affecting the position of the wipers.

157. In a machine of the class described, the combination with a shoe support and a spring for sustaining it, of end-lasting wipers carried by said shoe support and yieldably sustained to permit them to be depressed relatively to the shoe, means for depressing the wipers and positioning them in predetermined relation to the plane of the shoe bottom and for thereafter depressing the shoe and the wipers together against the resistance of said spring, said means comprising a wiper positioning device and a shoe engaging member mounted for movement heightwise of the shoe relatively to said device, mechanism for normally holding said member against such movement relatively to the wiper positioning device, wiper operating means, and connections for rendering said wiper operating means effective at a predetermined point in the operation of the wipers to render said holding mechanism inoperative and thereby permit the shoe to be forced against the wipers by said spring.

158. In a machine of the class described, the combination with a shoe support mounted for movement heightwise of the shoe, of a heel band and heel lasting wipers carried by said shoe support, said shoe support and wipers being relatively movable heightwise of the shoe, means for holding the wipers against such heightwise movement, and means for moving said support with its shoe and heel band toward the wipers.

159. In a machine of the class described, the combination with a shoe support mounted for movement heightwise of the shoe, of a heel band and heel-lasting wipers carried by said shoe support and movable relatively thereto lengthwise of the shoe, said wipers being yieldably sustained to permit relative movement heightwise of the shoe between them and the shoe support, means supported independently of the wipers for engaging them on the opposite side from the shoe to position them, and means for moving the shoe support with its shoe and heel band toward the wipers.

160. In a machine of the class described, means for lasting the toe of a shoe comprising a flexible apron for working the upper over the end and side faces of the last toward the edge of the insole by relative movement of said apron and the last heightwise of the last, and a pad of yieldable material for pressing said apron against the upper.

161. In a machine of the class described, a rubber apron for embracing the toe of a shoe and for working the upper lengthwise and laterally over the last by relative movement of the apron and the last lengthwise and heightwise of the last, and a soft rubber pad for holding said rubber apron in frictional engagement with the upper in locations where the surface of the last slopes inwardly toward the top of the forepart.

162. In a machine of the class described, the combination with a shoe support, of a yieldable rubber toe pad, an apron of flexible material arranged to lie between said toe pad and the shoe and to embrace the toe end of the shoe, and means for effecting relative movement of the shoe and said apron heightwise of the shoe to cause the apron to act frictionally on the upper under the pressure of said pad.

163. In a machine of the class described, an apron of flexible material for embracing the toe of a shoe, said apron being fastened at one edge only with its opposite edge portion free to adapt itself to the shape of the shoe, means for effecting relative movement of said apron and the shoe heightwise of the shoe to work the upper over the last, and a yieldable pad for holding said apron in frictional engagement with the upper.

164. In a machine of the class described, a soft rubber toe pad, a flexible apron arranged to overlie said toe pad, and means for depressing the toe of a shoe against said apron to cause the apron to act frictionally on the upper under the pressure of said pad.

165. In a machine of the class described, a toe pad of yieldable material having an approximately U-shaped recess to receive the toe of a shoe, a flexible apron arranged to overlie said toe pad with its inner edge portion unsecured for engaging the shoe upper about the toe under the pressure of said pad, and means for effecting relative movement of the shoe and said apron and toe pad heightwise of the shoe to work the upper over the last.

166. In a machine of the class described, the combination with a shoe support, of a soft rubber toe pad having an approximately U-shaped recess to receive the toe of the shoe, a rubber apron having a similarly shaped recess and arranged to lie between said toe pad and the upper, and means for effecting relative movement of the shoe and said pad and apron heightwise of the shoe to cause the apron to act frictionally on the upper under the pressure of said pad.

167. In a machine of the class described, a toe pad of yieldable material having an approximately U-shaped recess smaller than the toe of a shoe to adapt the pad to apply pressure localized about the end and sides of the toe, a flexible apron arranged to lie between said toe pad and the upper, and means for effecting relative movement of the shoe and said apron and toe pad to work the upper over the last.

168. In a machine of the class described, the combination with a shoe support, of a toe pad of yieldable material, a flexible apron arranged to extend lengthwise of the shoe and to be pressed by the toe pad against the shoe upper, and means for effecting relative movement of the shoe and said apron heightwise of the shoe to work the upper over the last about the end and the sides of the toe.

169. In a machine of the class described, a soft rubber toe pad having a recess so shaped as to adapt the pad to apply pressure localized about the end and sides of the toe of a shoe, a rubber apron arranged to lie between said pad and the shoe upper, and means for depressing the forepart of the shoe to cause the apron to act frictionally on the upper under the pressure of said pad to work the upper heightwise of the toe.

170. In a machine of the class described, means for lasting the forepart of a shoe comprising an apron of flexible material for embracing the shoe about the toe, means for effecting relative movement of the shoe and said apron heightwise of the shoe to cause the apron to act frictionally on the upper to work the upper toward the edge of the last bottom, a soft rubber toe pad for holding said apron in engagement with the upper about the end and sides of the toe, and means arranged to act through said apron to lay the upper inwardly over the bottom of the last.

171. In a machine of the class described, the combination with toe lasting wipers, of a rubber apron fastened above the wipers and arranged to extend over the edges of the wipers with its inner edge portion unsecured to permit it to adapt itself to the shape of the shoe, a yieldable pad for pressing said apron against the shoe below the wipers, means for effecting relative movement of the shoe and said pad and apron heightwise of the shoe to work the upper toward the edge of the last bottom, and means for operating the wipers to cause them to act through said apron to lay the upper inwardly over the bottom of the last.

172. In a machine of the class described, the combination with toe lasting wipers and a cover over the wipers, of a rubber apron secured to said cover and arranged to extend over the edges of the wipers, a soft rubber pad for engaging said apron below the wipers to press the apron against the shoe about the toe, means for effecting relative movement of the shoe and said pad and apron heightwise of the shoe to work the upper toward the edge of the last bottom, and means for operating the wipers to cause them to stretch said apron inwardly over the bottom of the last to lay the upper over the insole.

173. In a machine of the class described, the combination with a shoe support, of toe embracing wipers, a flexible apron arranged to extend over the edges of said wipers, a yieldable toe pad against which said apron is forced by depression of the shoe, means for depressing the shoe to cause the apron to work the upper heightwise of the toe toward the edge of the insole, and means for operating the wipers to cause them to act through said apron to lay the margin of the upper over the insole.

174. In a machine of the class described, a lasting device for engaging an upper frictionally about the forepart below the edge of the last bottom, means for effecting relative movement of said lasting device and the last heightwise of the last to work the upper toward the edge of the last bottom, and mechanism automatically operative in time relation to said relative movement to effect a relative movement of said lasting device and the last lengthwise of the last to work the upper forwardly toward the toe end of the last.

175. In a machine of the class described, a frictional lasting device of yieldable material for working the forepart of an upper toward the edge of the last bottom by relative movement of said device and the last heightwise of the last, and mechanism automatically operative in time relation to said relative movement to effect a relative movement of said device and the last lengthwise of the last to work the upper forwardly.

176. In a machine of the class described, the combination with toe wipers for laying an upper inwardly over an insole, of a device for engaging the upper frictionally about the toe to work it toward the edge of the last bottom, and means for imparting to said device a predetermined movement lengthwise of the shoe to work the upper forwardly.

177. In a machine of the class described, forepart lasting means comprising a flexible apron for embracing the toe of a shoe and a rubber pad for pressing said apron against the upper, and means for effecting in time relation relative movements of the shoe and said apron and pad heightwise and lengthwise of the shoe to work the upper toward the edge of the last bottom and to draw it forwardly toward the toe.

178. In a machine of the class described, frictional forepart lasting means comprising a soft rubber toe pad recessed to localize its pressure on the shoe about the end and the sides of the forepart, means for effecting relative movement of said pad and the shoe heightwise of the shoe, and cam means for moving said pad forwardly in time relation to said relative movement.

179. In a machine of the class described, a frictional forepart lasting device of yieldable material, means for sinking the forepart of a shoe into said lasting device to work the upper toward the edge of the last bottom, and a cam for imparting to said device a predetermined movement lengthwise of the shoe to work the upper forwardly.

180. In a machine of the class described, a forepart lasting device, a shoe depressor for sinking the forepart of a shoe into said lasting device to work the upper toward the edge of the last bottom, and a cam movable with said shoe depressor to impart a forward movement to said lasting device.

181. In a machine of the class described, the combination with a shoe support, of a toe pad box having a rubber toe pad together with wipers and a flexible lasting apron thereon, means for depressing the forepart of the shoe to render said apron effective to work the upper toward the edge of the last bottom, and means for imparting to said toe pad box with its toe pad, apron and wipers a movement lengthwise of the shoe to work the upper forwardly.

182. In a machine of the class described, shoe end lasting means comprising an end wiper device mounted for advancing movement lengthwise of the shoe and side wiper members mounted for movement laterally of the shoe without advancing movement, and mechanism operated by the advancing movement of said end wiper device for imparting to the side wiper members their movement laterally of the shoe.

183. In a machine of the class described, shoe end lasting means comprising an end wiper device mounted for movement lengthwise of the shoe, side wiper devices movable laterally of the shoe, and interengaging toothed members operated by the movement of said end wiper device for imparting operative movement to the side wiper devices.

184. In a machine of the class described, a slide mounted for movement lengthwise of a shoe and having end wiping means thereon, additional slides movable laterally of the shoe and having means for laying the upper inwardly at the rear of said end wiping means, and members operated by the movement of said first-named slide for imparting operative movement to said additional slides.

185. In a machine of the class described, end lasting means comprising an end wiper slide and side wiper slides movable respectively lengthwise and laterally of a shoe, and gear sectors operated by said end wiper slide for imparting operative movement to the side wiper slides.

186. In a machine of the class described, shoe end lasting means comprising an end wiper device movable lengthwise of a shoe and having lateral extensions thereon, gear sectors operated by said extensions, and side wiper members arranged to be operated by said gear sectors to lay the upper inwardly at the rear of the end wiper device.

187. In a machine of the class described, end wiping means mounted for advancing movement lengthwise of a shoe and comprising wiper members mounted for closing movement laterally of the shoe, and side wiping devices movable laterally of the shoe in response to the advancing movement of said end wiping means, said side wiping devices being arranged to impart closing movement to the end wiper members.

188. In a machine of the class described, shoe end lasting means comprising a slide movable lengthwise of the shoe, end wiper members mounted on said slide for closing movement laterally of the shoe, side wiper members movable laterally of the shoe, means operated by movement of said slide for imparting operative movement to said side wiper members, and means movable laterally of the shoe with the side wiper members for imparting closing movement to the end wiper members.

189. In a machine of the class described, shoe end lasting means comprising a slide movable lengthwise of the shoe, end wiper members mounted on said slide for closing movement laterally of the shoe, additional slides movable laterally of the shoe and having side wiper members thereon, gear members operated by said first-named slide for imparting operative movement to said additional slides, and means on said additional slides for imparting closing movement to the end wiper members.

190. In a machine of the class described, an end wiper device and side wiper devices movable respectively lengthwise and laterally of a shoe and comprising end wiper members arranged to interlock with the side wiper devices and to be closed in laterally of the shoe by the movement of said devices, and means operated by the end wiper device for imparting operative movement to the side wiper devices.

In testimony whereof I have signed my name to this specification.

BERNHARDT JORGENSEN.

CERTIFICATE OF CORRECTION.

Patent No. 1,722,499.                                           Granted July 30, 1929, to

BERNHARDT JORGENSEN.

It is hereby certified that error appears in the printed specification of the above numbered patent requiring correction as follows: Page 5, line 114, for the word "relative" read "relation"; page 17, line 16, claim 48, for "last" read "lasting"; page 26, line 3, claim 147, for "permit" read "prevent"; and that the said Letters Patent should be read with these corrections therein that the same may conform to the record of the case in the Patent Office.

Signed and sealed this 22nd day of July, A. D. 1930.

(Seal)                                                                            Wm. A. Kinnan,
                                                                             Acting Commissioner of Patents.